(12) United States Patent
Shimada et al.

(10) Patent No.: US 6,890,049 B2
(45) Date of Patent: May 10, 2005

(54) PRINTING SYSTEM, METHOD OF RECORDING IMAGES, AND INK CARTRIDGE ATTACHABLE TO PRINTING SYSTEM

(75) Inventors: Kazumichi Shimada, Nagano-ken (JP); Toshiaki Kakutani, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/651,802

(22) Filed: Aug. 29, 2003

(65) Prior Publication Data

US 2004/0104966 A1 Jun. 3, 2004

Related U.S. Application Data

(63) Continuation of application No. 10/061,336, filed on Feb. 4, 2002, now Pat. No. 6,637,850, which is a continuation of application No. 08/905,216, filed on Aug. 1, 1997, now Pat. No. 6,341,841.

(30) Foreign Application Priority Data

Aug. 2, 1996 (JP) ............................................. 8-220656

(51) Int. Cl.⁷ ............................. B41J 2/205; B41J 2/21
(52) U.S. Cl. .......................................... 347/15; 347/43
(58) Field of Search ...................... 347/15, 43; 358/1.1, 358/1.9

(56) References Cited

U.S. PATENT DOCUMENTS

| | | | |
|---|---|---|---|
| 4,533,923 A | 8/1985 | Suzuki | |
| 4,543,590 A | 9/1985 | Tazaki et al. | |
| 4,665,435 A | 5/1987 | Miura | |
| 4,672,432 A | 6/1987 | Sakurada et al. | |
| 4,714,936 A | 12/1987 | Helinski et al. | |
| 4,959,790 A | 9/1990 | Morgan | |
| 5,402,245 A | 3/1995 | Motta et al. | |
| 5,742,306 A | 4/1998 | Gompertz et al. | |
| 5,861,896 A | 1/1999 | Barton et al. | |
| 6,053,609 A | 4/2000 | Barton et al. | |
| 6,341,841 B1 * | 1/2002 | Shimada et al. | ............... 347/43 |
| 6,637,850 B2 * | 10/2003 | Shimada et al. | ............... 347/15 |

FOREIGN PATENT DOCUMENTS

| | | |
|---|---|---|
| JP | 60-154073 | 3/1985 |
| JP | 60-141585 | 7/1985 |
| JP | 02-003365 | 1/1990 |
| JP | 03-005161 | 1/1991 |
| JP | 03-0747756 | 2/1991 |
| JP | 04-310747 | 11/1992 |
| JP | 05-116343 | 5/1993 |
| JP | 06-328733 | 11/1994 |
| JP | 07-132619 | 5/1995 |
| JP | 08-025655 | 1/1996 |

* cited by examiner

*Primary Examiner*—Thinh Nguyen
(74) *Attorney, Agent, or Firm*—Stroock & Stroock & Lavan LLP

(57) ABSTRACT

A printing system of the present invention reduces a total amount of discharge of at least three different color inks that are mixable to express hues in a predetermined range without deteriorating the degree of granularity. The printing system of the invention reads recording ratios of the respective color inks corresponding to input tone data regarding the respective color inks from tables TC, TM, and TY and forms dots according to the recording ratios. Yellow ink Y has a higher dye density than a balancing density that ensures a color balance. This makes the recording ratio of the yellow ink Y lower than the recording ratios of cyan ink C and magenta ink M. The yellow ink Y has high lightness, so that sparely formed dots do not increase the degree of granularity even in an area of low tone data. The enhanced density of the yellow ink Y reduces the total amount of inks discharged from a head to satisfy a required printing density.

26 Claims, 19 Drawing Sheets

Fig. 9

INK COMPOSITIONS AND PROPERTIES

| | | C1 | C2 | M1 | M2 | Y | Bk |
|---|---|---|---|---|---|---|---|
| DYES | Directblue199 | 3.6 | 0.9 | | | | |
| | Acidred289 | | | 2.8 | 0.7 | | |
| | Directyellow86 | | | | | 2.7 | |
| | Foodblack2 | | | | | | 4.8 |
| DIETHYLENE GLYCOL | | 30 | 35 | 20 | 25 | 30 | 25 |
| SURFINOL 465 | | 1 | 1 | 1 | 1 | 1 | 1 |
| WATER | | 65.4 | 63.1 | 76.2 | 73.3 | 66.3 | 69.2 |
| VISCOSITY (mPa·s) | | 3.0 | 3.0 | 3.0 | 3.0 | 3.0 | 3.0 |

RECORDING RATIO BY YELLOW INK Y1
OF STANDARD DENSITY = 100%

RECORDING RATIO BY YELLOW INK Y2
OF HIGHER DENSITY = 67%
(DENSITY OF RESULTING IMAGE
IS EQUAL TO (a))

RECORDING RATIO BY MAGENTA INK M
OF STANDARD DENSITY = 100%

RECORDING RATIO BY YELLOW INK Y2
OF HIGHER DENSITY = 67% +
RECORDING RATIO BY MAGENTA INK M
OF STANDARD DENSITY = 100%

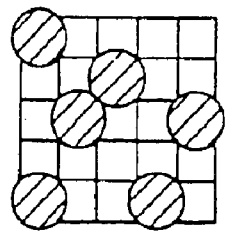
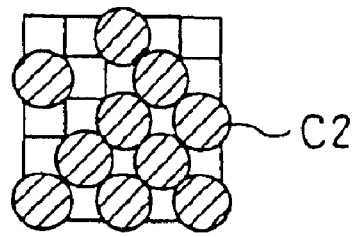
*FIG. 19A*  *FIG. 19B*
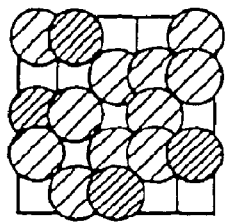
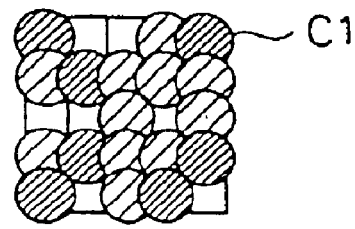
*FIG. 19C*  *FIG. 19D*
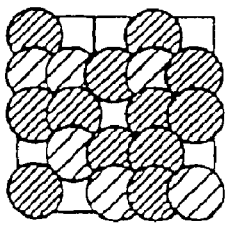
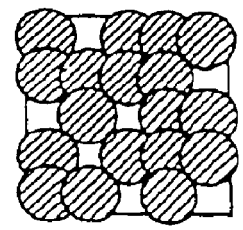
*FIG. 19E*  *FIG. 19F*
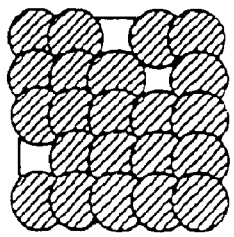
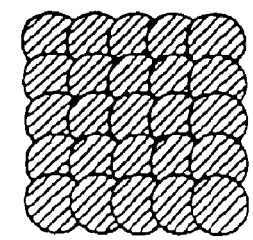
*FIG. 19G*  *FIG. 19H*

PRINTING SYSTEM, METHOD OF RECORDING IMAGES, AND INK CARTRIDGE ATTACHABLE TO PRINTING SYSTEM

CROSS-REFERENCE TO RELATED APPLICATIONS

This application is a continuation of application Ser. No. 10/061,336 filed on Feb. 4, 2002, now U.S. Pat. No. 6,637,850, which is a continuation of application Ser. No. 08/905,216, filed on Aug. 1, 1997, now U.S. Pat. No. 6,341,841.

BACKGROUND OF THE INVENTION

1. Field of the Invention

The present invention relates to a printing system, which has a head for recording three or more different inks that are mixable to express hues in a predetermined range and records multi-tone images with the inks discharged from the head onto a printing object. The present invention also pertains to a method of recording images and an ink cartridge attachable to such a printing system.

2. Description of the Related Art

Color printers with a head for recording a plurality of color inks on a printing object are widely used as an output device of a computer, which prints multi-color, multi-tone images processed by the computer. The following techniques are known as the method of recording inks on a printing object: a thermal transfer system that melts inks on ink ribbons and transfers the molten inks to a sheet of paper; an ink jet system that sprays colored ink solutions onto a sheet of paper; and an electrophotographic system that uses laser or another light to create a latent image on a photoconductive intermediary and transfers color toners to render the latent image visible. All such available techniques reproduce colors in a predetermined hue range by mixing a plurality of color inks. Three color inks, cyan, magenta, and yellow (CMY) are generally used for full-color printing.

There are several techniques available for printing multi-tone, multi-color images with a plurality of color inks. One available technique, which is adopted in the conventional printers, expresses the tone of a printed image by the density of dots (the frequency of appearance of dots per unit area) while fixing the size of dots formed on a sheet of paper by a stream of ink droplets. Another available technique adjusts the diameter of dots formed on a sheet of paper, in order to vary the density of ink per unit area. The advanced fine working of the head for creating ink particles has improved the density of dots formable per predetermined length or the variable range of dot diameters.

The improvement in printers has, however, so far been limited to 300 dpi through 720 dpi in printing density or resolution and several tens microns in particle diameter. This is significantly lower than the level of expression or resolution of silver photography, which has reached several thousands dpi on the film. Dots are sparsely formed in an area of low image density, that is, in an area of low density of dots to be printed. This increases the degree of granularity and makes the dots undesirably conspicuous. In printers for spraying liquid ink onto a paper, the total amount of ink sprayed per unit area is restricted by the absorbable volume of ink by the paper (generally referred to as ink duty). The restriction of ink duty is an issue to be cleared in printers using a plurality of color inks for color printing. The issue of ink duty is actualized especially in case that higher-density ink and lower-density ink are provided for the respective colors and the lower-density ink is used for printing low-tone areas in order to decrease the degree of granularity. Expression of a specific tone with the lower-density ink results in increasing the total amount of ink sprayed per unit area.

SUMMARY OF THE INVENTION

The object of the present invention is thus to regulate the density of a specific color ink and relieve the restriction of ink duty while keeping the quality of a printed image in a printing system with a head for spraying three or more different inks that are mixable to express hues in a predetermined range.

At least part of the above and the other related objects are realized by a first printing system having a head for recording at least three different color inks, which are mixable to express hues in a predetermined range, on a printing object, wherein a density ratio of a specific color ink, which has highest lightness against a fixed recording ratio among the at least three different color inks, to the other color inks is determined, in order to enable a color balance to be biased to the specific color ink having the highest lightness in case that the specific color ink and the other color inks have an identical recording ratio per unit area. The first printing system includes correction means for correcting a recording amount of the specific color ink having the highest lightness to a level that cancels the bias.

The present invention is also directed to a first image recording method corresponding to the first printing system. The first method records a multi-tone image by controlling a head that is able to record at least three different color inks, which are mixable to express hues in a predetermined range, and regulating a distribution of dots formed by the at least three different color inks based on tone signals regarding an original image to be printed. The first method includes the steps of:

determining a density ratio of a specific color ink, which has highest lightness against a fixed recording ratio among the at least three different color inks, to the other color inks, in order to enable a color balance to be biased to the specific color ink having the highest lightness in case that the specific color ink and the other color inks have an identical recording ratio per unit area; and correcting a recording amount of the specific color ink having the highest lightness to a level that cancels the bias.

The first printing system (or the corresponding first image recording method) of the present invention has a head for recording at least three different color inks that are mixable to express hues in a predetermined range. The printing system forms dots of these color inks at a predetermined ratio, so as to record images of various hues and lightness (densities). In the first printing system, the color balance is biased to the specific color ink having highest lightness against a fixed recording ratio, in case that all the color inks have an identical recording ratio per unit area. The correction means then corrects the recording amount of the specific color ink having the highest lightness to a level that cancels the bias. Such correction ensures a normal color balance and reduces the recording amount of the specific color ink having the highest lightness and less effect of granularity in a low density area. This structure accordingly reduces the total amount of inks to be recorded while keeping the quality of a resulting image.

At least part of the above and the other related objects are also realized by a second printing system having a head for recording at least three different color inks, which are mixable to express hues in a predetermined range, on a printing object, wherein a density ratio of a specific color ink, which has lowest conspicuousness of granularity against a fixed recording ratio among the at least three different color inks, to the other color inks is determined, in order to enable a color balance to be biased to the specific color ink having the lowest conspicuousness of granularity in case that the specific color ink and the other color inks have an identical recording ratio per unit area. The second printing system includes correction means for correcting a recording amount of the specific color ink having the lowest conspicuousness of granularity to a level that cancels the bias.

The present invention is further directed to a second image recording method corresponding to the second printing system. The second method records a multi-tone image by controlling a head that is able to record at least three different color inks, which are mixable to express hues in a predetermined range, and regulating a distribution of dots formed by the at least three different color inks based on tone signals regarding an original image to be printed. The second method includes the steps of:

determining a density ratio of a specific color ink, which has lowest conspicuousness of granularity against a fixed recording ratio among the at least three different color inks, to the other color inks, in order to enable a color balance to be biased to the specific color ink having the lowest conspicuousness of granularity in case that the specific color ink and the other color inks have an identical recording ratio per unit area; and correcting a recording amount of the specific color ink having the lowest conspicuousness of granularity to a level that cancels the bias.

The second printing system (or the corresponding first image recording method) of the present invention has a head for recording at least three different color inks that are mixable to express hues in a predetermined range. The printing system forms dots of these color inks at a predetermined ratio, so as to record images of various hues and lightness (densities). In the second printing system, the color balance is biased to the specific color ink having lowest conspicuousness of granularity against a fixed recording ratio, in case that all the color inks have an identical recording ratio per unit area. The correction means then corrects the recording amount of the specific color ink having the lowest conspicuousness of granularity to a level that cancels the bias. Such correction ensures a normal color balance and reduces the recording amount of the specific color ink having the lowest conspicuousness of granularity. This structure accordingly reduces the total amount of inks to be recorded while keeping the quality of a resulting image.

Three primary color inks, that is, yellow, magenta, and cyan inks, are practically adopted as the at least three different color inks in the first and the second printing systems. It is also practical to select yellow as the specific color ink having the highest lightness or the lowest conspicuousness of granularity. In another combination of color inks, the specific color ink having highest lightness or lowest conspicuousness of granularity should be selected among all the color inks.

There are a variety of approaches to bias the color balance in the specified combination of color inks. One possible approach increases the dye density of the specific color ink having the highest lightness or the lowest conspicuousness of granularity in a range of 1.1 to 4 times a balancing density that ensures a color balance in case that the at least three different color inks have an identical recording ratio per unit area. The increased density of less than 1.1 times can not exert the expected effects, whereas the increased density of greater than 4 times worsens the degree of granularity. Simple adjustment of the dye density can readily bias the color balance to a desired extent.

Correction of the recording amount of the specific color ink having the highest lightness or the lowest conspicuousness of granularity may be accomplished by decreasing the proportion of dots formed by the specific color ink or by decreasing the diameter of dots formed by the specific color ink.

Another possible approach to bias the color balance in the specified combination of color inks sets the diameter of dots formed by the specific color ink having the highest lightness or the lowest conspicuousness of granularity to be greater than the diameter of dots formed by the other color inks. In this case, the correction means carries out the required correction by decreasing the proportion of dots formed by the specific color ink.

A variety of known methods are applicable to record at least three different color inks on a printing object. By way of example, each of these color inks is provided as a solution prepared by dissolving or dispersing a dye or a pigment in a solvent, and each solution containing the dye or the pigment is sprayed from the head onto the printing object.

In this structure, the correction means corrects the discharge amount of the specific color ink. The method of spraying the ink solution advantageously forms fine dots at a relatively high speed.

In the printing system using such ink solutions, it is preferable that at least two types of inks having different densities are provided for the color inks other than the specific color ink among the at least three different color inks. In this structure, the specific color ink having the highest lightness or the lowest conspicuousness of granularity as well as the at least two types of inks having different densities with respect to the other color inks are sprayed from the head. This structure provides the low-density, light ink for the colors having relatively high conspicuousness of granularity, thereby preventing an increase in degree of granularity in a low density area.

In the color combination of yellow, magenta, and cyan, the at least two types of inks having different densities are provided for magenta and cyan. The dye density of the lower-density ink with respect to each color is approximately one quarter the dye density of the higher-density ink. This ensures natural effects on a density variation in the place where dots of the deep ink are mixed with dots of the light ink.

A variety of techniques are applicable to form dots of the respective color inks. For example, the dither method may be applied to determine formation or non-formation of dots by each color ink. In the dither method, a threshold matrix of discrete dither can be used to determine the on/off state of dots. The threshold matrix of discrete dither well disperses the dots and thus advantageously improves the degree of granularity.

A variety of mechanisms are applicable for dot formation in such printing systems. By way of example, the head may have a mechanism for discharging ink particles under a pressure applied to each ink running through an ink conduit by application of a voltage to a piezoelectric element arranged in the ink conduit, or a mechanism for discharging ink particles under a pressure applied to each ink running through an ink conduit by air bubbles that are produced by a supply of electricity to a heating body arranged in the ink conduit.

The present invention is further directed to an ink cartridge attachable to either one of the above printing systems or used in either one of the above methods, which has a head for recording at least three different color inks, which are mixable to express hues in a predetermined range, on a printing object. The ink cartridge includes the at least three different color inks, which are mixable to express hues in the predetermined range and stored therein. At least either one of a specific color ink having highest lightness against a fixed recording ratio and a specific color ink having lowest conspicuousness of granularity against the fixed recording ratio among the at least three different color inks has a dye density higher than a balancing density that ensures a color balance in case that the at least three different color inks have an identical recording ratio per unit area. A volume of the specific color ink stored in the ink cartridge is not greater than a volume of each of the other color inks.

In the printing systems and the corresponding image recording methods discussed above, the specific color ink having highest lightness or lowest conspicuousness of granularity against a fixed recording ratio has the increased dye density and thereby the decreased volume of consumption. The volume of the specific color ink stored in the ink cartridge is accordingly equal to or less than the volumes of the other color inks. This enables the respective color inks to be used up at substantially the same timings.

In case that at least two types of inks having different densities are provided for the color inks other than the specific color ink having the highest lightness or the lowest conspicuousness of granularity, each of the at least two types of inks having different densities has a less volume of consumption. In this case, the volume of the specific color ink stored in the ink cartridge may be set greater than the volume of each of the at least two types of inks having different densities.

These and other objects, features, aspects, and advantages of the present invention will become more apparent from the following detailed description of the preferred embodiment with the accompanying drawings.

BRIEF DESCRIPTION OF THE DRAWINGS

FIG. 5 is a perspective view showing a color ink cartridge 70a;

FIG. 9 shows compositions of color inks used in the embodiment;

FIG. 19 shows a process of creating dots by light ink and deep ink; and

DESCRIPTION OF THE PREFERRED EMBODIMENTS

Figure 1:
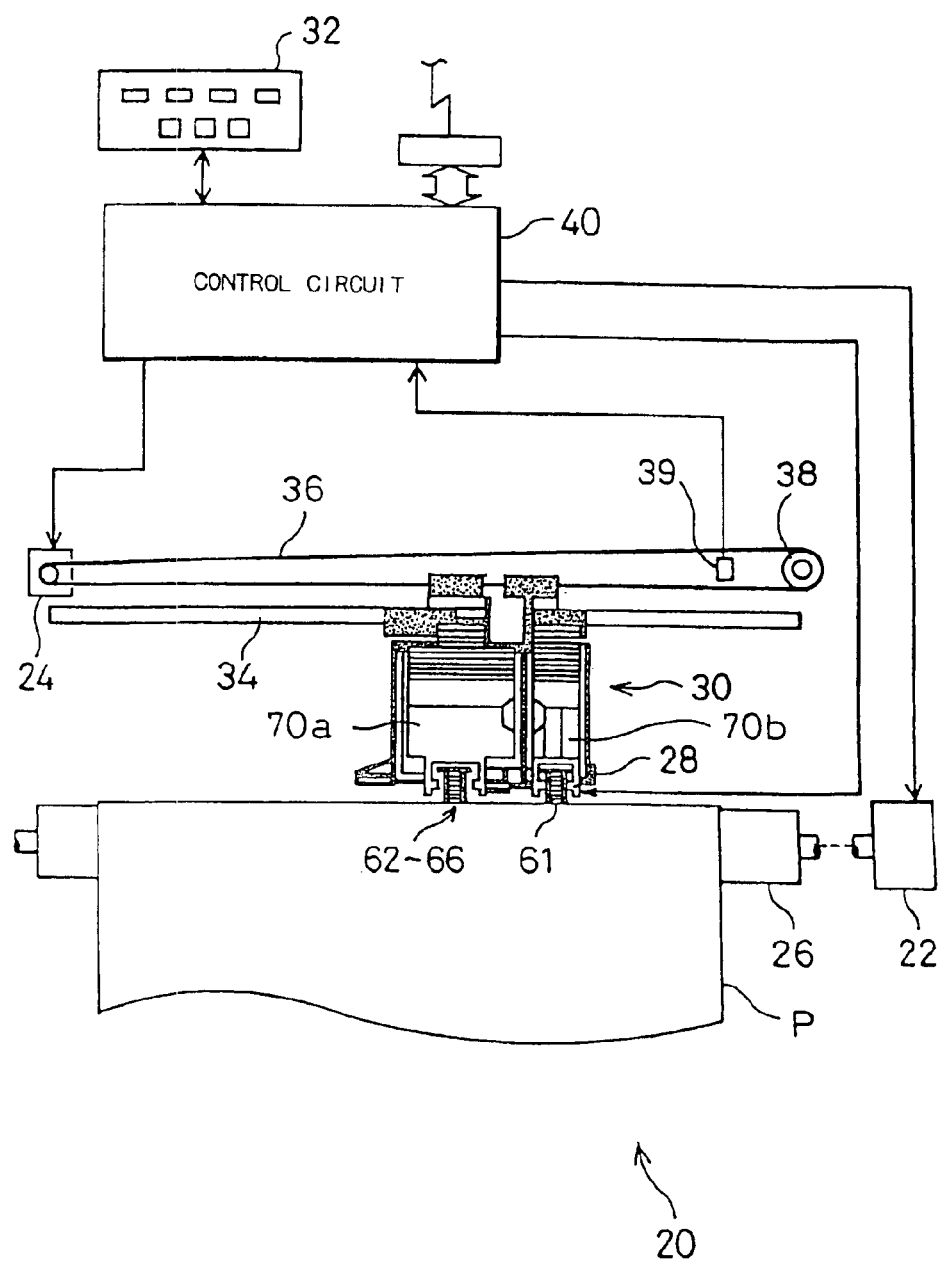
FIG. 1 schematically illustrates structure of a printer 20 embodying the present invention.

One mode of carrying out the present invention is described below as a preferred embodiment. FIG. 1 schematically illustrates structure of a printer 20 embodying the present invention. Referring to FIG. 1, the printer 20 has a mechanism for feeding a sheet of paper P by means of a sheet feed motor 22, a mechanism for reciprocating a carriage 30 along the axis of a platen 26 by means of a carriage motor 24, a mechanism for driving a print head 28 mounted on the carriage 30 to control discharge of inks and formation of dots, and a control circuit 40 for transmitting signals to and from the sheet feed motor 22, the carriage motor 24, the print head 28, and a control panel 32.

The mechanism for feeding the sheet of paper P has a gear train (not shown) for transmitting rotations of the sheet feed motor 22 to the platen 26 as well as a sheet feed roller (not shown). The mechanism for reciprocating the carriage 30 includes a sliding shaft 34 arranged in parallel with the axis of the platen 26 for slidably supporting the carriage 30, a pulley 38, an endless drive belt 36 spanned between the carriage motor 24 and the pulley 38, and a position sensor 39 for detecting the position of the origin of the carriage 30.

Figure 2:
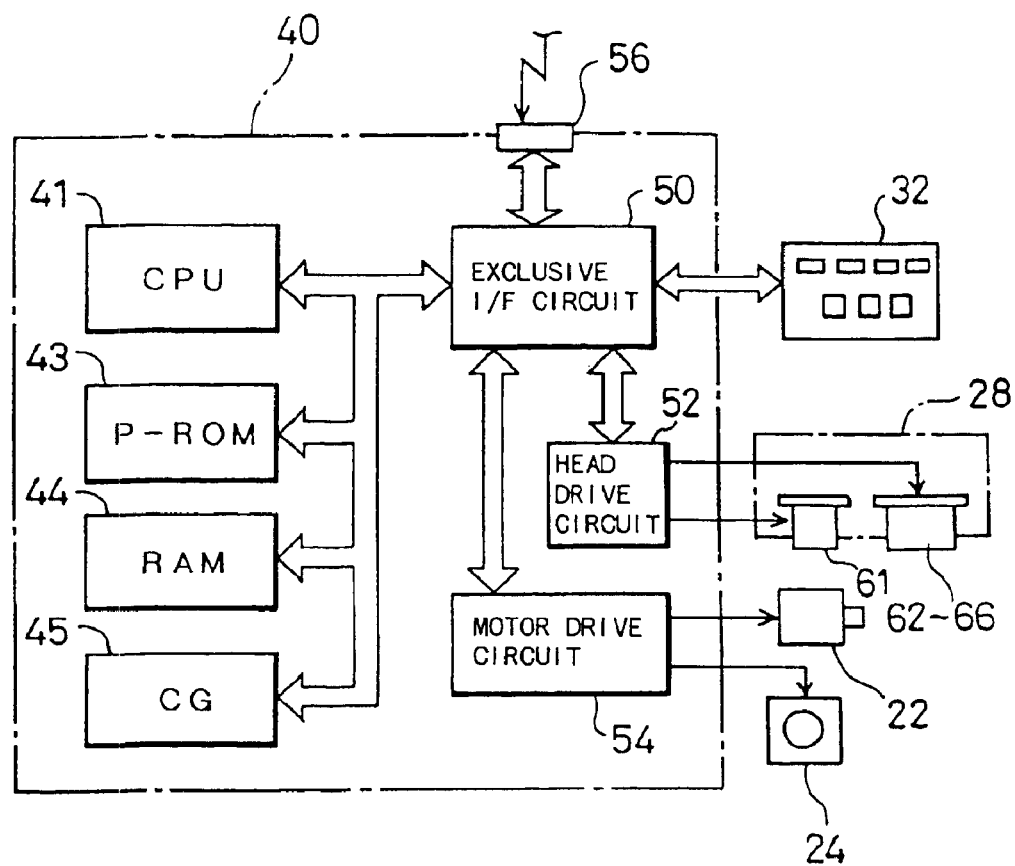
FIG. 2 is a block diagram showing structure of a control circuit 40 included in the printer 20.

FIG. 2 is a block diagram illustrating structure of the control circuit 40 and peripheral units included in the printer 20. Referring to FIG. 2, the control circuit 40 is constructed as a known arithmetic and logic operation circuit including a CPU 41, a P-ROM 43 for storing programs, a RAM 44, and a character generator (CG) 45 for storing dot matrices of characters. The control circuit 40 further includes an exclusive I/F circuit 50 exclusively working as an interface to an external motor and the like, a head drive circuit 52 connecting with the exclusive I/F circuit 50 for driving the print head 28, and a motor drive circuit 54 connecting with the exclusive I/F circuit 50 for driving the sheet feed motor 22 and the carriage motor 24. The exclusive I/F circuit 50 includes a parallel interface circuit and is connected to a computer via a connector 56 to receive printing signals output from the computer. Output of image signals from the computer will be discussed later.

Figure 3:
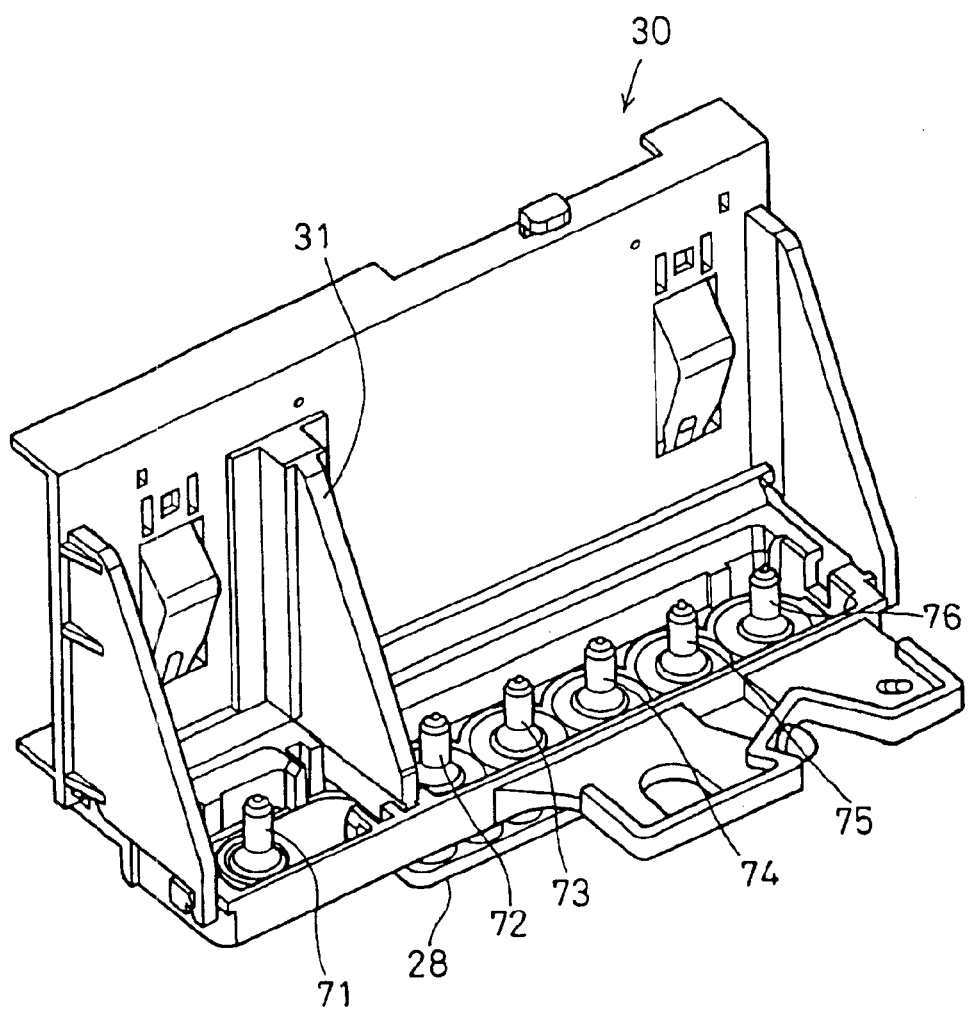
FIG. 3 is a perspective view illustrating structure of a carriage 30 included in the printer 20.
Figure 4:
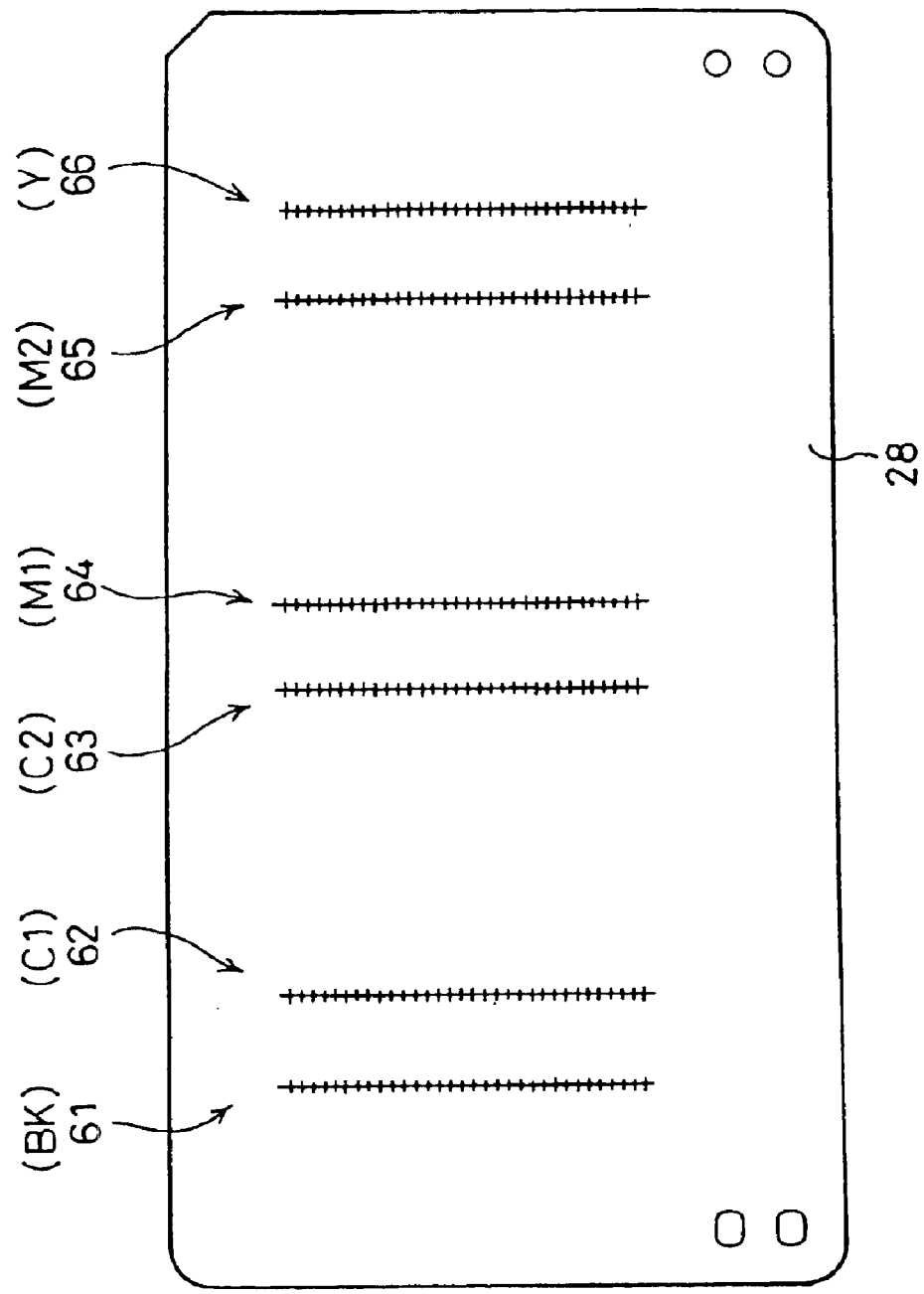
FIG. 4 shows an arrangement of color ink heads 61 through 66 in a print head 28.
Figure 5:
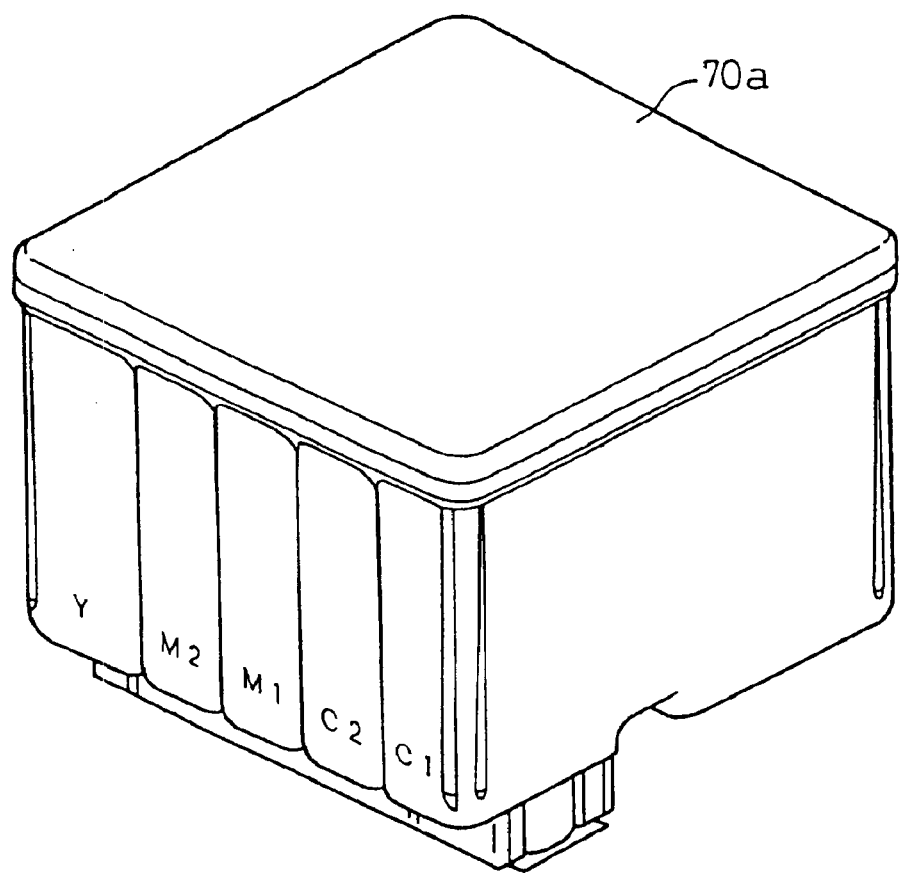

The following describes a concrete structure of the carriage 30 and the principle of discharging ink by the print head 28 mounted on the carriage 30. FIG. 3 is a perspective view showing structure of the carriage 30. FIG. 4 is a plan view illustrating nozzles arranged in the print head 28 set on the lower portion of the carriage 30 for spraying the respective color inks. A color ink cartridge 70a and a black ink cartridge 70b are attachable to the substantially L-shaped carriage 30 shown in FIG. 3. Detailed structure of the color ink cartridge 70a is shown in FIG. 5. A partition wall 31 separates the black ink cartridge 70b from the color ink cartridge 70a. Referring to FIG. 4, six color ink heads 61 through 66 for respectively discharging color inks are formed in the print head 28 that is disposed on the lower portion of the carriage 30. Ink supply pipes 71 through 76 for leading inks from ink tanks to the respective color ink heads 61 through 66 are formed upright on the bottom of the carriage 30 as shown in FIG. 3. When the color ink cartridge 70a and the black ink cartridge 70b are attached downward to the carriage 30, the ink supply pipes 71 through 76 are inserted into connection apertures (not shown) formed in the respective cartridges 70a and 70b.

Figure 6:
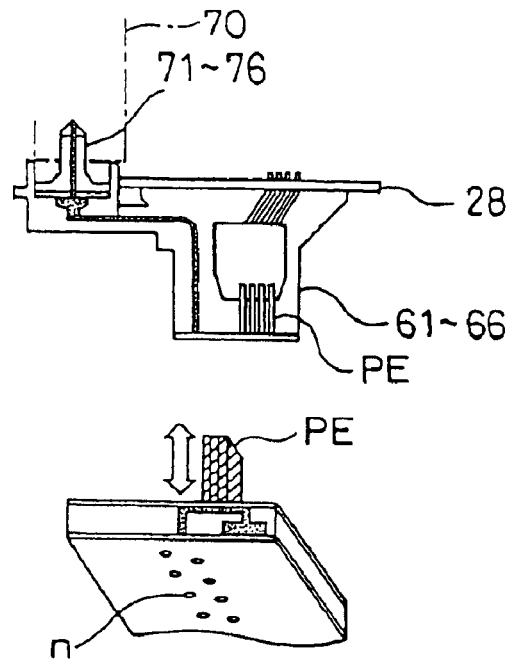
FIG. 6 shows a mechanism of ink discharge in each of the color ink heads 61 through 66.

When the ink cartridge 70 (including the color ink cartridge 70a and the black ink cartridge 70b) is attached to the carriage 30, inks in the ink cartridge 70 are sucked out by capillarity through the ink supply pipes 71 through 76 and are led to the color ink heads 61 through 66 formed in the print head 28 arranged on the lower portion of the carriage 30 as shown in FIG. 6. In case that the ink cartridge 70 is attached to the carriage 30 for the first time, a pump works to suck inks into the respective color ink heads 61 through 66. In this embodiment, structures of the pump for suction and a cap for covering the print head 28 during the suction are not illustrated nor described specifically.

Figure 7A:
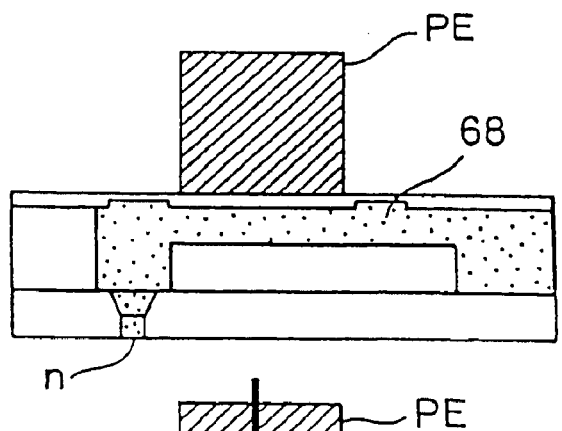
FIGS. 7A and 7B show a process of discharging ink particles Ip by extension of a piezoelectric element PE.
Figure 7B:
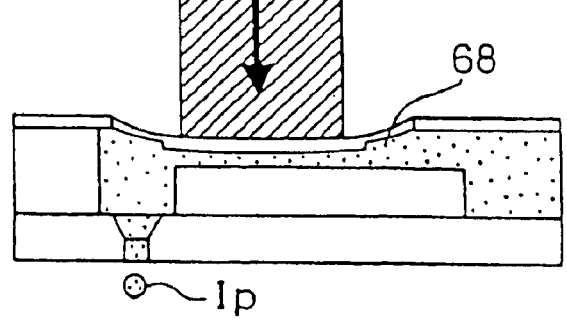

A row of thirty-two nozzles 'n' are formed in each of the color ink heads 61 through 66 as shown in FIGS. 4 and 6. A piezoelectric element PE having excellent response, which is one of electrically distorting elements, is arranged for each row of nozzles 'n'. FIGS. 7A and 7B illustrate a configuration of the piezoelectric element PE and the nozzles 'n'. The piezoelectric element PE is disposed at a position that comes into contact with an ink conduit 80 for leading ink to the nozzles 'n'. As is known, the piezoelectric element PE has a crystal structure that is subjected to a mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to abruptly extend and deform one side wall of the ink conduit 80 as shown in the drawing of FIG. 7B. The volume of the ink conduit 80 is reduced with an extension of the piezoelectric element PE, and a certain amount of ink corresponding to the volume reduction is sprayed as ink particles Ip from the ends of the nozzles 'n' at a high speed. The ink particles Ip soak into the sheet of paper P set on the platen 26, so as to print images.

In order to ensure spaces for the piezoelectric elements PE, the six color ink heads 61 through 66 are divided into three pairs on the print head 28 as shown in FIG. 4. The first pair includes the black ink head 61 that is arranged at one end close to the black ink cartridge 70b and the cyan ink head 62 that is disposed next to the black ink head 61. The second pair includes the light cyan ink head 63 for cyan ink having the lower density than that of the standard cyan ink supplied to the cyan ink head 62 (hereinafter referred to as light cyan ink) and the magenta ink head 64. The third pair includes the light magenta ink head 65 for magenta ink having the lower density than that of the standard magenta ink supplied to the magenta ink head 64 (hereinafter referred to as light magenta ink) and the yellow ink head 66. The compositions and densities of the respective inks will be discussed later.

Figure 8:
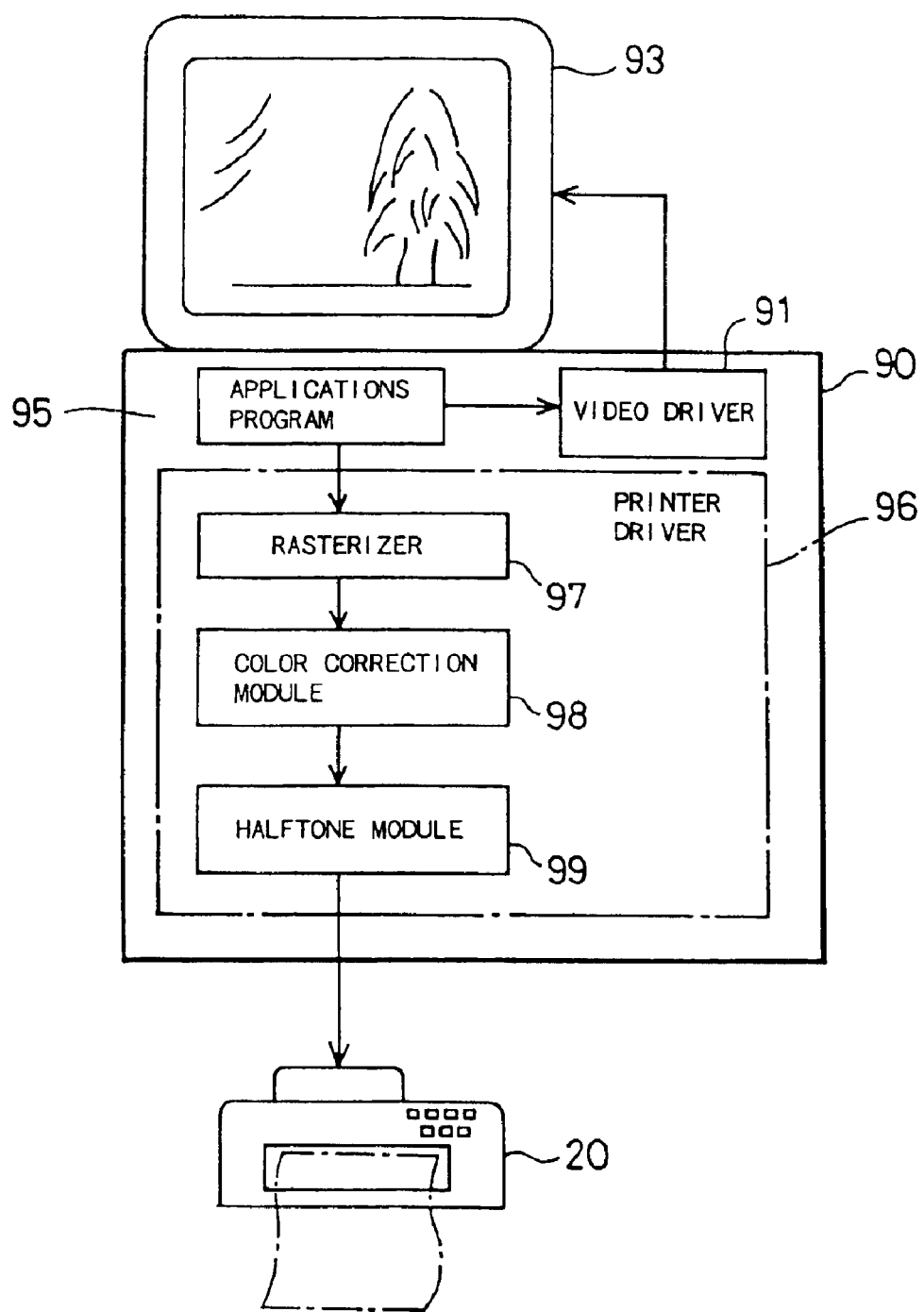
FIG. 8 is a block diagram showing a series of processes that enable a computer 90 to print images based on image information.

In the printer 20 of the embodiment having the hardware structure discussed above, while the sheet feed motor 22 rotates the platen 26 and the other related rollers to feed the sheet of paper P, the carriage motor 24 drives and reciprocates the carriage 30, simultaneously with actuation of the piezoelectric elements PE on the respective color ink heads 61 through 66 of the print head 28. The printer 20 accordingly sprays the respective color inks and transfers multicolor images onto the sheet of paper P. Referring to FIG. 8, the printer 20 prints multi-color images based on signals output from an image production apparatus, such as a computer 90, via the connector 56. In this embodiment, an applications program 95 working in the computer 90 processes images and displays the processed images on a CRT display 93 via a video driver 91. When the applications program 95 outputs a printing instruction, a printer driver 96 in the computer 90 receives image information from the applications program 95 and the printer 20 converts the image information to printable signals. In the example of FIG. 8, the printer driver 96 includes a rasterizer 97 for converting the image information processed by the applications program 95 to dot-based color information, a color correction module 98 for causing the image information that has been converted to the dot-based color information (tone data) to be subjected to color correction according to the colorimretric characteristics of an image output apparatus, such as the printer 20, and a halftone module 99 for generating halftone image information, which expresses density of a specified area by the existence or non-existence of ink in each dot unit, from the color-corrected image information. Operations of these modules are known to the skilled in the art and are thus not specifically described here in principle, though the contents of the halftone module 99 will be discussed later.

As discussed above, the printer 20 of the embodiment has the print head 28 including a plurality of color ink heads, from which the respective color inks are sprayed. As shown in FIG. 9, yellow ink Y and black ink K discharged from the corresponding color ink heads 61 and 66 respectively include 2.7% by weight of Direct yellow 86 and 4.8% by weight of Food black 2 as dyes. The print head 28 has the additional heads 63 and 65 for light cyan ink and light magenta ink other than the four heads 61, 62, 64, and 66 for the standard four color inks K, C, M, and Y. As shown in FIG. 9, light cyan ink and light magenta ink have lower dye densities than those of the standard cyan ink and magenta ink.

Cyan ink of standard density (defined as C1 in FIG. 9) includes 3.6% by weight of Direct blue 199 as a dye, 30% by weight of diethylene glycol, 1% by weight of Surfinol 465, and 65.4% by weight of water. Light cyan ink (defined as C2 in FIG. 9), on the other hand, includes only 0.9% by weight of Direct blue 99, that is, one quarter the dye density of the cyan ink C1, and 35% by weight of diethylene glycol and 63.1% by weight of water for adjustment of the viscosity. Magenta ink of standard density (defined as M1 in FIG. 9) includes 2.8% by weight of Acid red 289 as a dye, 20% by weight of diethylene glycol, 1% by weight of Surfinol 465, and 76.2% by weight of water. Light magenta ink (defined as M2 in FIG. 9), on the other hand, includes only 0.7% by weight of Acid red 289, that is, one quarter the dye density of the magenta ink M1, and 25% by weight of diethylene glycol and 73.3% by weight of water for adjustment of the viscosity. All these inks are regulated to have the viscosity of approximately 3 [mPa·s]. In this embodiment, the respective color inks are prepared to have substantially the same surface tension as well as the viscosity of identical level. This ensures identical control of the piezoelectric elements PE for the respective color ink heads 61 through 66, irrespective of the type of inks for creating dots.

Among these inks, all the color inks C1, C2, M1, M2, and Y other than the black ink K are stored in the color ink cartridge 70a shown in FIG. 5. In this embodiment, the volume of the yellow ink Y is greater than the volume of each of the other inks (C1, C2, M1, and M2). Lower-density ink (light ink) and higher-density ink (deep ink) are provided for cyan and magenta, and the volume of the yellow ink Y is smaller than the total volume of light ink and deep ink with respect to cyan or magenta in the embodiment. The volume of the yellow ink may, however, be equal to the total volume of light ink and deep ink with respect to each color or equal to the volume of each light ink or deep ink.

Figure 10:
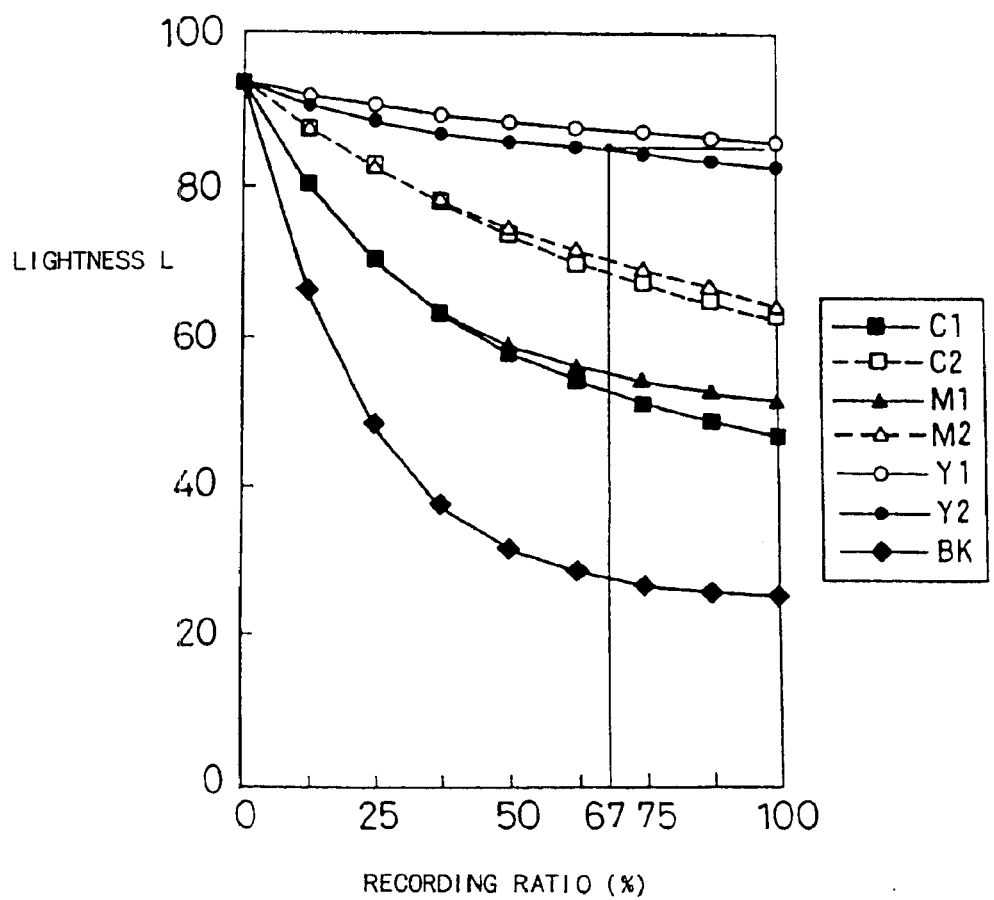
FIG. 10 is a graph showing the lightness plotted against the recording ratio of each color ink.

FIG. 10 is a graph showing the lightness L* plotted against the recording ratio with respect to the color inks used in the embodiment. The abscissa of FIG. 10 denotes the recording ratio to the recording resolution of the printer, that is, the proportion of dots printed on the white sheet of paper P by the ink particles Ip sprayed out of the nozzles 'n'. The recording ratio=100 represents the state, in which the whole surface of the sheet of paper P is covered with the ink particles Ip. This embodiment uses yellow ink Y2 having a greater dye density than that of standard yellow ink Y1. As clearly seen in the graph of FIG. 10, the yellow ink Y has the highest lightness among the three primary colors C, M, and Y. Even at the recording ratio of 100%, the lightness L* of the yellow ink Y is far over 80%. The lightness L* here represents the lightness in a CIE1976L*a*b* color space (CIELAB space).

In the graph of FIG. 10, the curve of closed circles represents the relationship between the lightness and the recording ratio with respect to the yellow ink Y2, whereas the curve of open circles represents the same with respect to the yellow ink Y1 of standard density. The dye density of the yellow ink Y2 is 1.5 times as high as the dye density of the standard yellow ink Y1. The lightness decreases in proportion to the 1.5-fold dye density. The lightness of the yellow ink Y1 of standard density at the recording ratio of 100% is equal to the lightness of the yellow ink Y2 of higher density at the recording ratio of approximately 67%.

Figure 11:
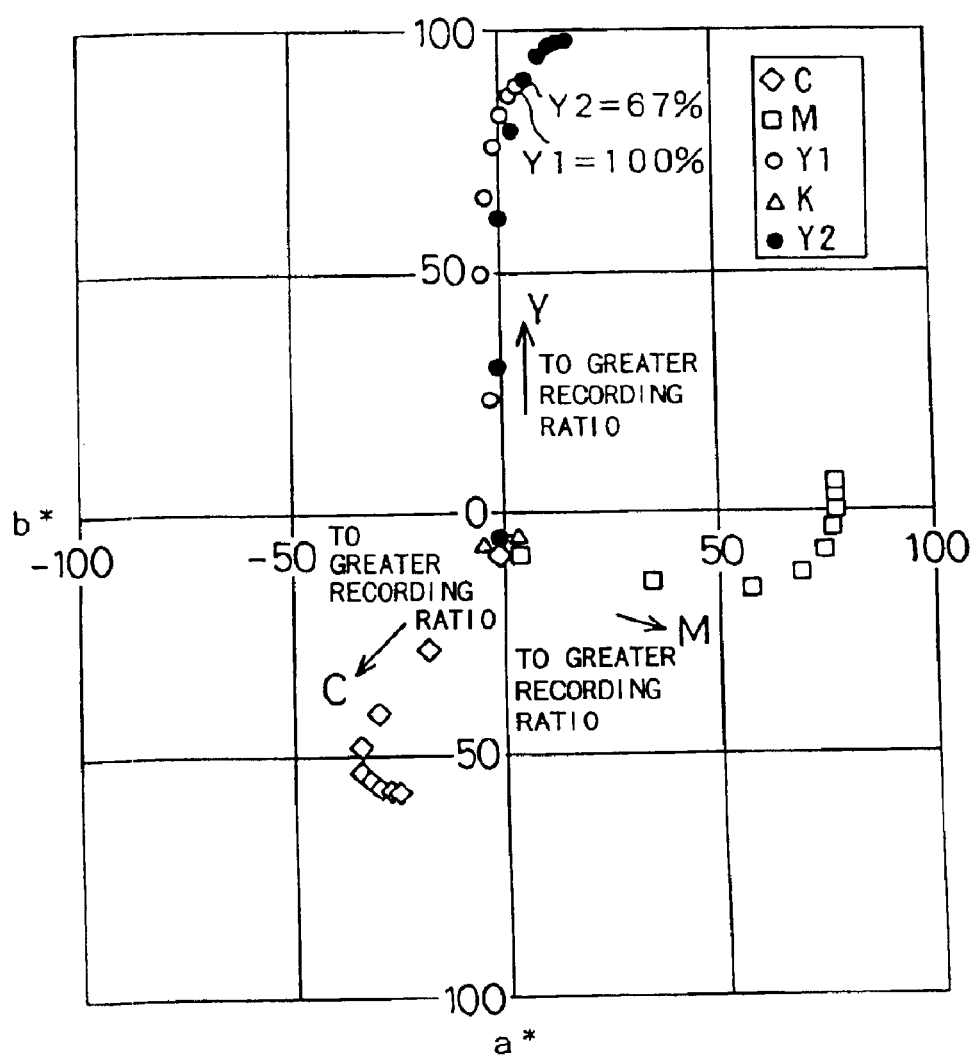
FIG. 11 shows the relationship between the hue and the saturation of each ink in the CIELAB space.

The following describes the relationship between the recording ratio, the hue, and the saturation with respect to the color inks. FIG. 11 shows the hue and the saturation with varying recording ratios in the case of printing images on a sheet of paper with three color inks, that is, yellow, magenta, cyan. The graph of FIG. 11 represents data of a*b* in the CIE1976L*a*b* color space (CIELAB space). In the CIELAB space, the angle from the abscissa denotes the hue and the distance from the origin (0,0) denotes the saturation.

The graph of FIG. 11 shows variations in hue and saturation with an increase in recording ratio by 10% each time for the color inks C, M, and Y1 of standard densities (respectively expressed by the open diamonds, the open squares, and the open circles).

Variations in hue and saturation for the yellow ink Y2 of the embodiment are expressed by the closed circles, wherein the dye density of the yellow ink Y2 is 1.5 times as high as the dye density of the standard yellow ink Y1. The saturation (chromatic purity) of the yellow ink Y2 varies at a greater rate than that of the standard yellow ink Y1 with an increase in recording ratio by 10% each time. The saturation of the yellow ink Y2 at the recording ratio of 66% substantially coincides with the saturation of the standard yellow ink Y1 at the recording ratio of 100%. This characteristic naturally narrows the range of regulating the number of dots. In the case of a 10×10 matrix, 0 to 100 dots are regulated for the yellow ink Y1 of standard density, whereas only 0 to 66 dots are regulated for the yellow ink Y2 of higher density.

The color of gray is formed by recording the three color inks of standard densities at identical recording ratios. The hue of gray is deviated to the side of yellow when the yellow ink Y2 of the embodiment is recorded at the same recording ratio as those of cyan and magenta inks.

In this embodiment, both the lower-density ink and the higher-density ink are applied for the cyan C and magenta M. The lightness of the lower-density ink and the higher density ink satisfies the following relationship. The light cyan ink C2 has approximately one quarter the dye density (percent by weight) of the cyan ink C1. The lightness of the light cyan ink C2 at the recording ratio of 100% is substantially equal to the lightness of the cyan ink C1 at the recording ratio of approximately 35%. This relationship is also applicable to the lightness of the magenta ink M1 and the light magenta ink M2. The proportion of the recording ratios of different-density inks giving the identical lightness is specified by the beauty of color mixture in case that the two different-density inks are mixed in print. In practice, it is desirable to adjust the proportion in the range of 20% to 50%. This relationship is substantially equivalent to the adjustment of the dye density (percent by weight) of the lower-density ink (the light cyan ink C2 or the light magenta ink M2) to almost one fifth to one third the dye density (percent by weight) of the higher-density ink (the cyan ink C1 or the magenta ink M1).

Figure 12:
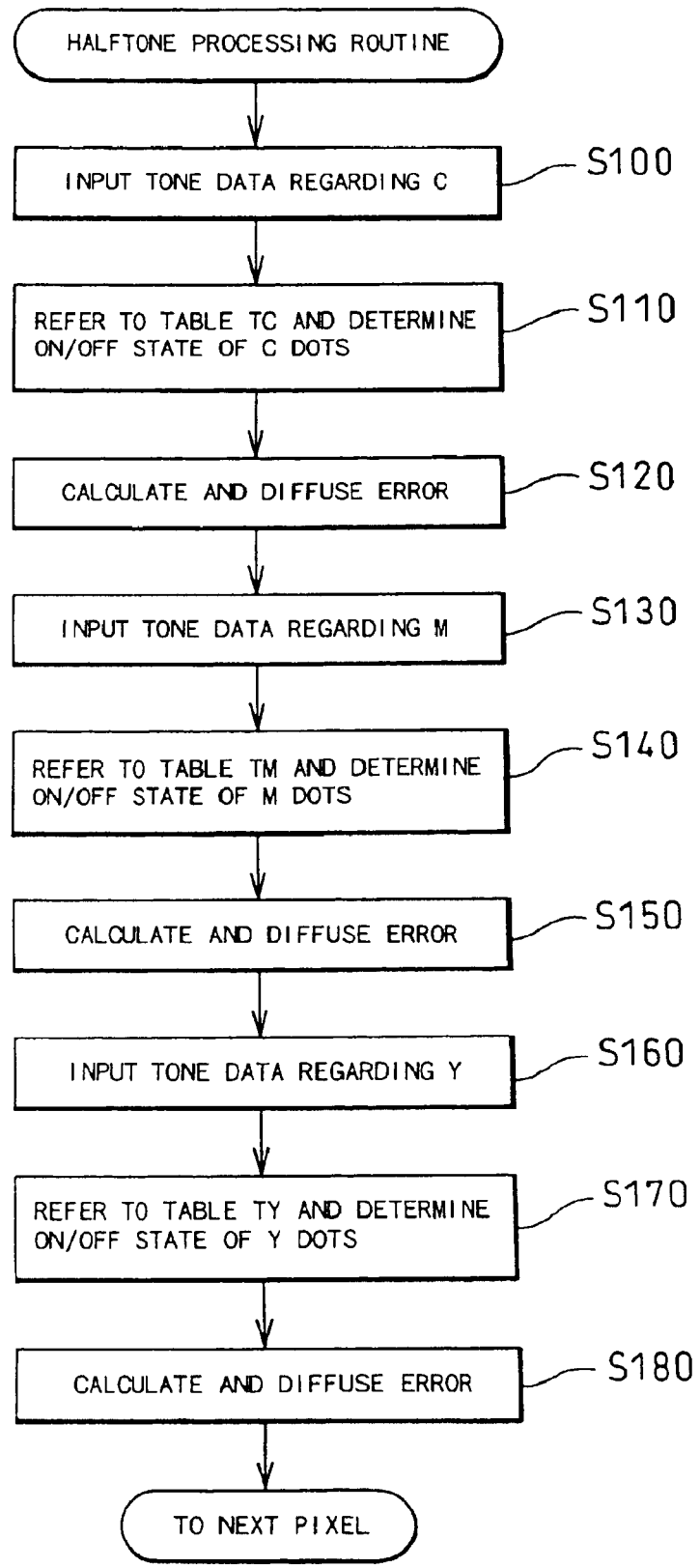
FIG. 12 is a flowchart showing a halftone processing routine executed by a halftone module 99.

In the printer 20 of the embodiment, the halftone module 99 of the printer driver 96 carries out the processing to form dots of the respective color inks. The printer 20 of the embodiment uses both the higher-density ink (deep ink) and the lower-density ink (light ink) for cyan and magenta, and formation of dots by the higher-density ink (deep dots) and formation of dots by the lower-density ink (light dots) follow different processing routines. The following description first regards the process of forming dots by the yellow ink of higher density and the cyan ink and magenta ink of standard densities and additionally the process of forming dots by the higher-density ink and the lower density ink. FIG. 12 is a flowchart showing a halftone processing routine for the C, M, and Y colors carried out by the halftone module 99. In the halftone process, the same procedures are basically repeated for the C, M, and Y colors.

Figure 13:
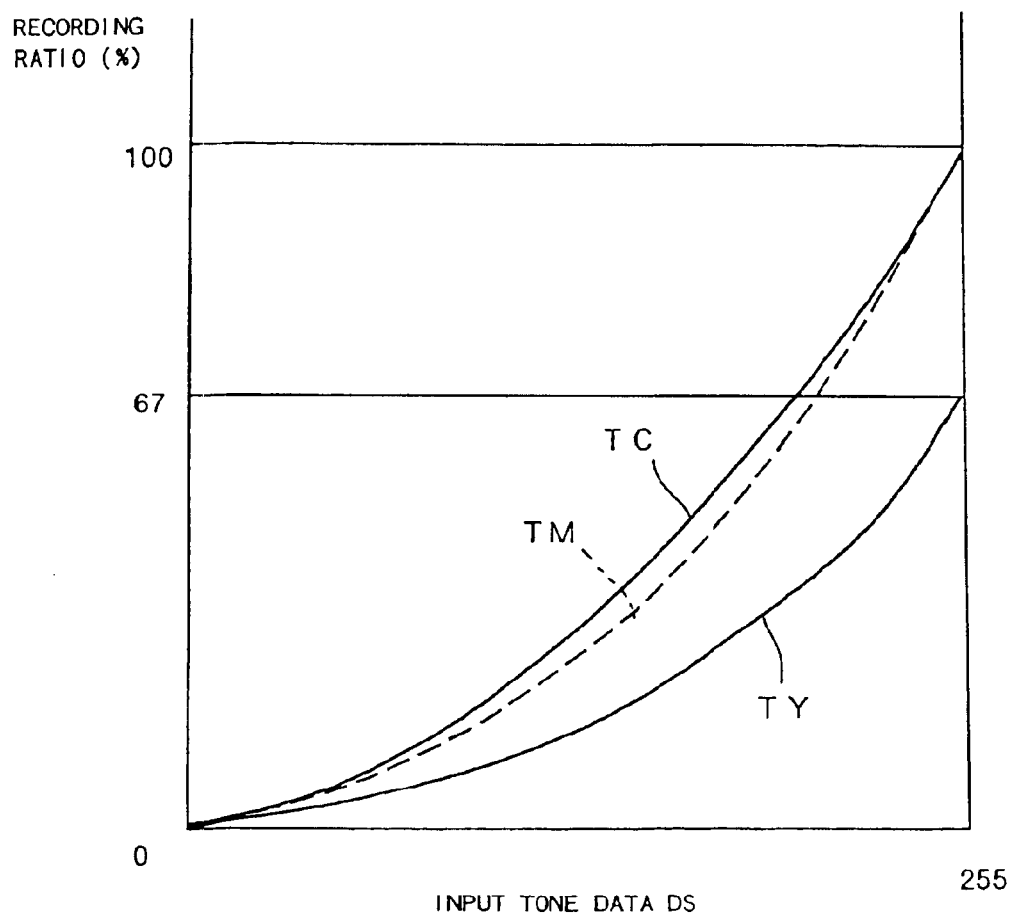
FIG. 13 is a graph showing the relationship between the input data and the recording ratio with respect to cyan, magenta, and yellow inks.
Figure 14:
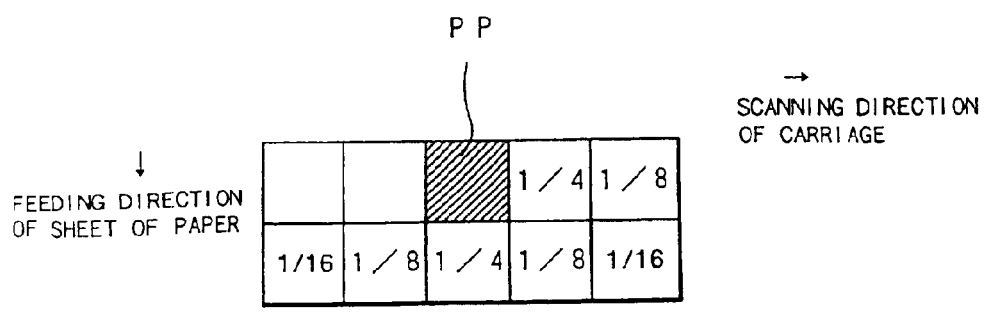
FIG. 14 shows weights added to the peripheral pixels, into which an error is distributed in the process of error distribution.

When the program enters the routine of FIG. 12, at step S100, the halftone module 99 first receives tone data of the cyan ink C among the tone data of the respective colors C, Y, and M converted by the color correction module 98 shown in FIG. 8. The tone data are expressed as 8-bit data and thereby take the values of 0 through 255. The halftone module 99 then reads the recording ratio corresponding to the input tone data from a table TC and determines the on/off state of dots for the cyan ink C at step S110. FIG. 13 shows an example of the table for the respective color inks. A variety of techniques, for example, error diffusion method and systematic dither method, are applicable to determine the on/off state of dots for each color ink. The error diffusion method is adopted in this embodiment. After determining the on/off state of dots based on the density of cyan regarding a target pixel, the halftone module 99 calculates and diffuses an error at step S120. In accordance with a concrete procedure, the difference between the true density regarding the target pixel and the density expressed by the on state or the off state of dots is calculated as an error. The error is then distributed to the peripheral pixels in the vicinity of the target pixel with predetermined weights. In the printing process by error diffusion, a density error occurring in a processed pixel is distributed in advance into peripheral pixels around the processed pixel with predetermined weights. The processing of step S120 accordingly reads the corresponding errors and causes the errors to affect the target pixel to be printed next. FIG. 14 illustrates a process of distributing the error occurring in a processed pixel PP into peripheral pixels with specified weights. The density error is distributed into several pixels after the processed pixel PP in the scanning direction of the carriage 30 and in the feeding direction of the sheet of paper P with predetermined weights (¼, ⅛, 1/16).

In this embodiment, inks of two different densities, that is, the deep ink and the light ink, are actually provided for cyan C and magenta M to form deep dots and light dots. For the better understanding of the characteristic of the present invention, that is, the higher density of the yellow ink Y, however, it is assumed that dots of cyan and magenta are formed only by the inks C and M of standard densities (corresponding to the higher-density inks C1 and M1) in the discussion based on the flowchart of FIG. 12.

After the above processing for the cyan ink, the same procedure is repeated for the magenta ink and the yellow ink. The halftone module 99 receives tone data of the magenta ink M at step S130, refers to a table TM in order to determine the on/off state of dots for magenta at step S140, and calculates and diffuses an error for magenta at step S150. The halftone module 99 then receives tone data of the yellow ink Y at step S160, refers to a table TY in order to determine the on/off state of dots for yellow at step S170, and calculates and diffuses an error for yellow at step S180. The recording ratio of dots by the yellow ink Y is reduced to approximately two thirds the recording ratios of dots by the cyan ink C and the magenta ink M as shown in FIG. 13.

Figure 15A:
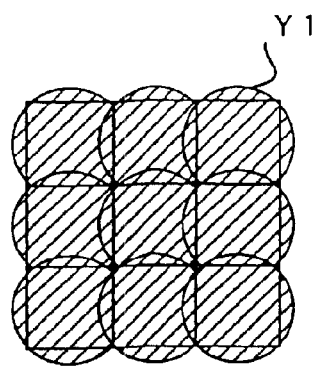
FIGS. 15A through 15D show formation of dots by yellow ink and magenta ink.
Figure 15B:
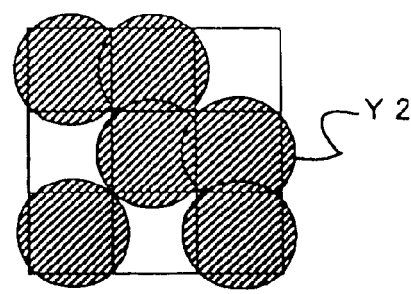
Figure 15C:
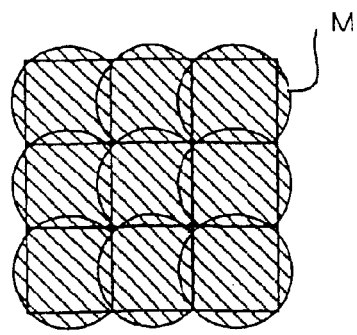
Figure 15D:
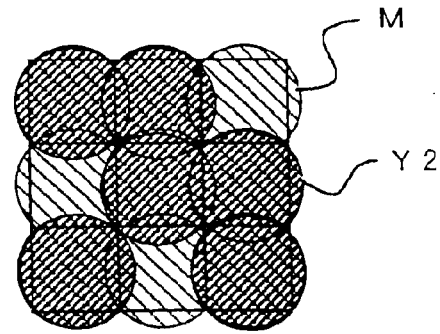

Since the recording ratio of dots for yellow ink is about two thirds the recording ratios of dots for cyan and magenta inks, yellow dots do not completely fill up the printing area even at the maximum tone data. FIGS. 15A through 15D show formation of dots at the maximum tones of magenta and yellow (tone data=255). In this example, the discrete dither method is adopted to determine the on/off state of dots in a unit matrix of 3×3. FIG. 15A shows formation of dots by the yellow ink Y1 of standard density, wherein the recording ratio is equal to 100[%] at the maximum tone data. In the case of the yellow ink Y2 of the embodiment having the higher density, on the other hand, only six dots are formed even at the maximum tone data (=255) as shown in FIG. 15B. FIG. 15C shows the case of the magenta ink M, wherein 3×3=9 dots are formed. In case that dots are formed by both the magenta ink M and the yellow ink Y2 of higher density, with respect to the three dots, only the magenta ink M is sprayed onto the paper as shown in FIG. 15D.

This results from the fact that the yellow ink Y2 has the dye density of 1.5 times as high as the dye density of the standard yellow ink Y1. The number of expressible tones by the yellow ink Y2 of higher density is two thirds that by the standard yellow ink Y1. Since the yellow ink originally has high lightness, sparely formed dots in a low-density area of an original image do not significantly increase the degree of granularity. The yellow ink Y2 of high density accordingly reduces the total number of dots formed per unit area, that is, the amount of ink sprayed onto a unit area, without deteriorating the picture quality due to the increase in granularity. Each paper has an upper limit (duty limit) for the total amount of ink dischargeable per unit area. It is accordingly advantageous that the increase in density of the yellow ink reduces the required amount of ink. By way of example, the composite black is realized by 100[%] of cyan ink+100[%] of magenta ink+60[%] of yellow ink Y2. Compared with the case using the yellow ink Y1 of standard density (maximum recording ratio=100[%]) and thereby requiring the total duty of 300[%], the case using the yellow ink Y2 of higher density requires the duty of 260[%]. This gives the margin of 40[%] with respect to the duty limit of the paper. As another example, dark red is recorded on a paper having the duty limit of 190[%]. The conventional method using the standard yellow ink Y1 can print dark red by 10[%] of cyan+100[%] of magenta+100[%] of yellow, resulting in the total duty of 210[%]. This method, however, exceeds the duty limit of the paper and should accordingly use the black ink to satisfy the duty limit as 90[%] of magenta+90[%] of yellow+10[%] of black. In the resulting print, conspicuous black dots having the highest density are sparely formed to realize dark red. This worsens the granularity and deteriorates the picture quality. The method of the embodiment using the yellow ink Y2 of high density, on the other hand, realizes dark red by 10[%] of cyan, 100[%] of magenta, and 67[%] of yellow. The total duty is lower than the duty limit of the paper. This accordingly ensures the favorable granularity and high picture quality. The method of the embodiment using the yellow ink of high density gives the margin with respect to the duty limit, thereby optimizing the amounts of the respective color inks and ensuring the high picture quality.

The method of the embodiment using the yellow ink of high dye density reduces the required number of dots. The decrease in number of dots gives the margin in overlap of the respective color inks. There are various devices regarding the overlap of inks. The fact that approximately one third the area is free from the dots of yellow ink advantageously increases the degree of freedom in arrangement of dots formed by overlapping a plurality of colors. The decrease in number of dots by the yellow ink naturally reduces the mean consumption of yellow ink in the process of printing a predetermined area. This results in reducing the required amount of yellow ink stored in the ink cartridge 70. The decrease in amount of yellow ink reduces the total weight of the ink cartridge 70 or allows an increase in amount of another color ink. This is especially advantageous in case that higher-density ink and lower-density ink are provided for specific colors like this embodiment.

The printer 20 of the embodiment uses higher-density ink and lower-density ink for magenta and cyan. The process of referring to the table TC and determining the on/off state of dots by the cyan ink C (step S110) and the process of referring to the table TM and determining the on/off state of dots by the magenta ink M (step S140) actually determine formation or non-formation of dots with respect to the higher-density ink and the lower-density ink.

A process of determining formation of deep dots and a process of determining formation of light dots are carried out at both steps S110 and S140. These processes fundamentally determine the on/off state of deep dots and light dots based on deep level data regarding the deep dots and light level data regarding the light dots. The deep level data and the light level data corresponding to the input tone data DS are read from the graph of FIG. 18.

For example, in case that the input tone data of cyan represents a solid area of 50/256, the recording ratio of the deep cyan ink C1 is equal to 0%, so that the value of deep level data Dth is equal to zero. In case that the input tone data represents a solid area of 95/256, the recording ratio of the deep cyan ink C1 is equal to 7%, so that the value of deep level data Dth is equal to 18. In case that the input tone data represents a solid area of 191/256, the recording ratio of the deep cyan ink C1 is equal to 75%, so that the value of deep level data Dth is equal to 191. In the routine of determining the on/off state of light dots formed by a lighter ink discussed below, the corresponding recording ratios of the light cyan ink C2 are 36%, 58%, and 0%, respectively.

Figure 16:
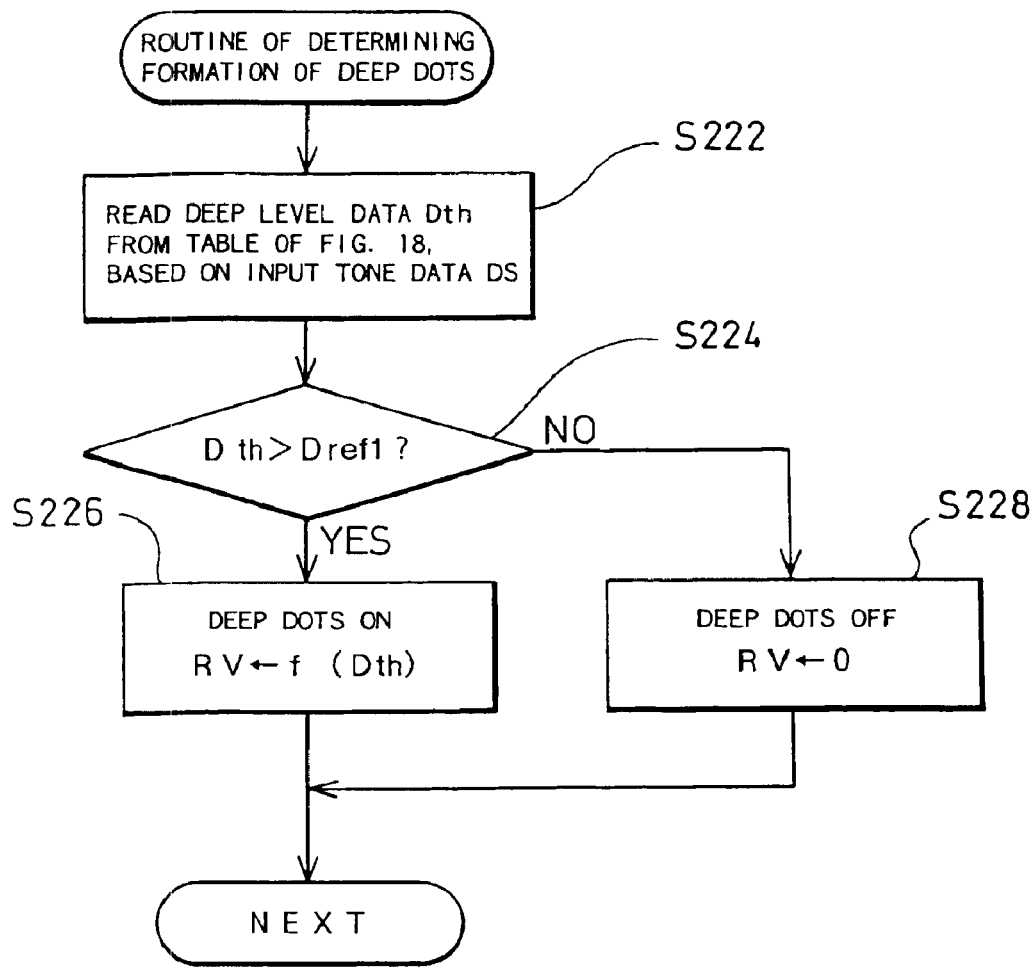
FIG. 16 is a flowchart showing a routine for determining formation of deep dots.
Figure 18:
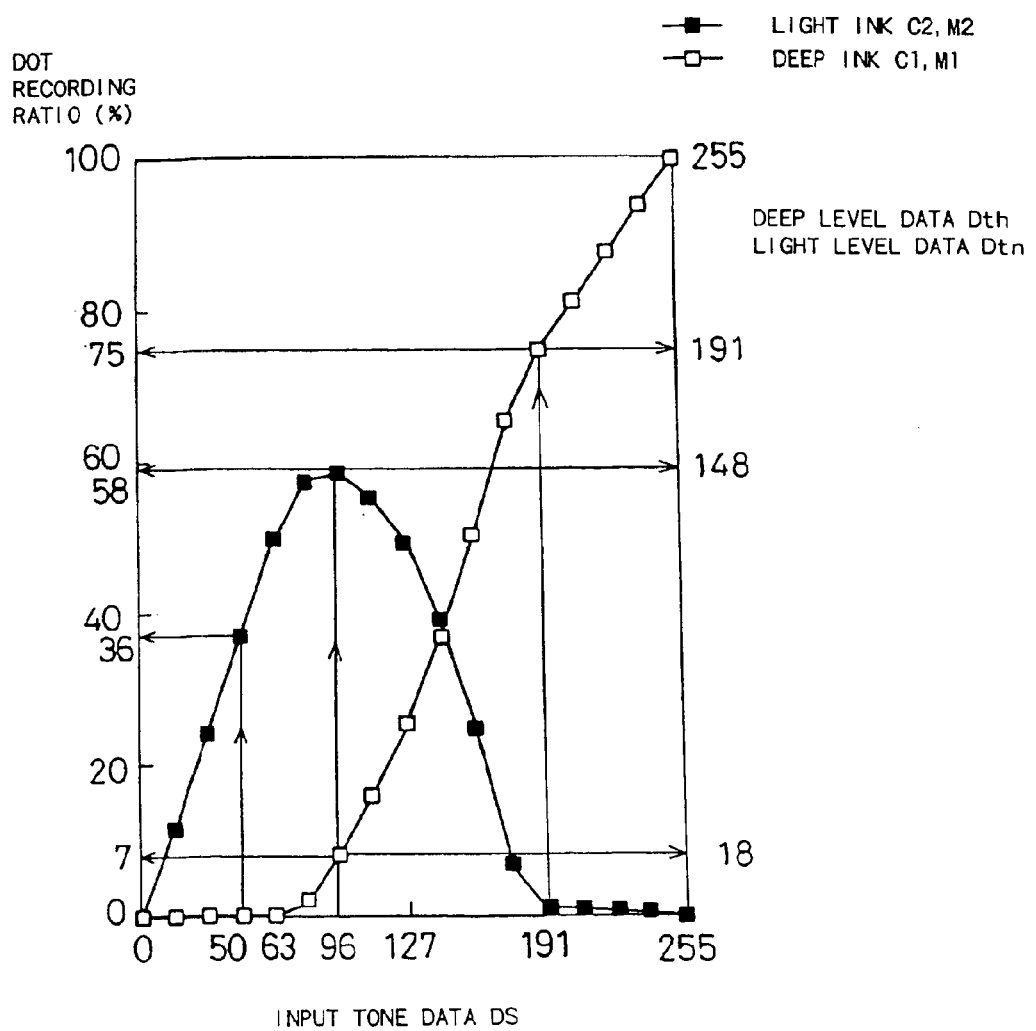
FIG. 18 is a graph showing the relationship between the tone data and the recording ratios of light ink and deep ink in the embodiment.
Figure 20A:
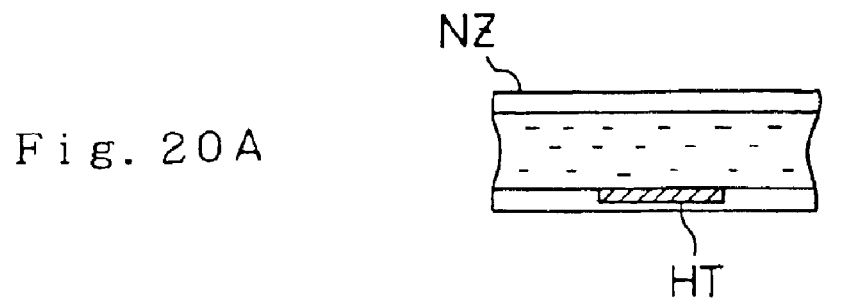
FIGS. 20A through 20E show another mechanism for discharging ink particles.
Figure 20B:
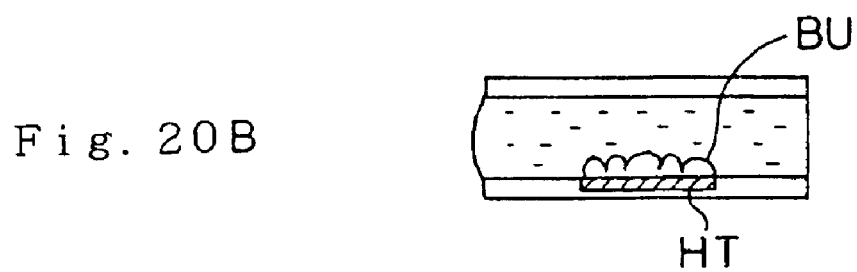
Figure 20C:
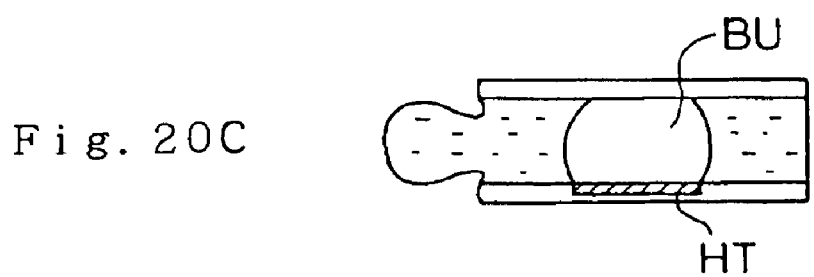
Figure 20D:
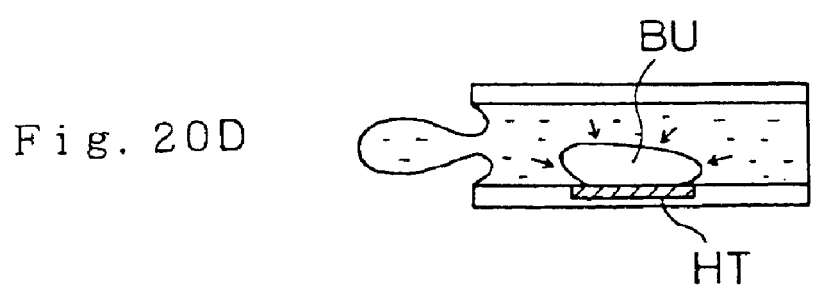
Figure 20E:
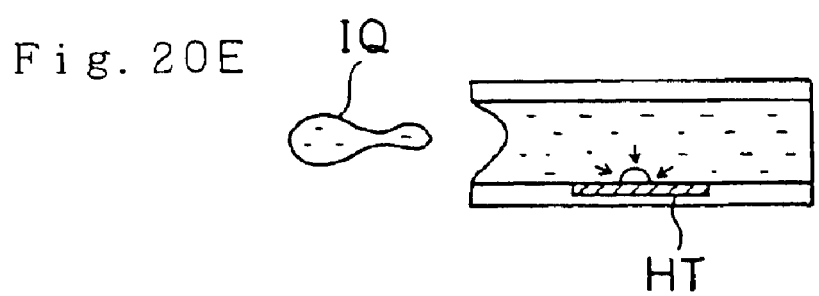

The following describes the process of determining formation of dots by taking advantage of the characteristics shown in the graph of FIG. 18. The procedure first determines the on/off state of deep dots based on the input tone data DS. This follows a routine of determining formation of deep dots shown in the flowchart of FIG. 16. When the program enters the routine of FIG. 16, the halftone module 99 first refers to the table shown in FIG. 18 and reads deep level data Dth corresponding to the input tone data DS at step S222. FIG. 18 is a table showing the recording ratios of light ink and deep ink plotted against the tone data of the original image. The tone data DS take the values of 0 to 255 for each color (8 bit-data for each color), and the magnitude of the tone data is accordingly expressed, for example, as 16/256 in the following description.

The deep level data Dth is then compared with a predetermined threshold value Dref1 at step S224, in order to determine the on/off state of deep dots. Although the error diffusion method is adopted in this embodiment, a dither method may be applied to determine the on/off state of dots. In the latter case, the systematic dither method using a threshold matrix of discrete dither is preferably adopted to set the threshold value. The threshold matrix of discrete dither may be, for example, a wide-range matrix of 64×64 in size (blue noise matrix). In this case, the threshold value Dref1 used as the criterion for determining the on/off state of deep dots takes different values for the respective target pixels. The discrete dither ensures the high spatial frequency of dots determined by the threshold matrix and makes dots sufficiently scattered in any specific area. A concrete example of the discrete dither is a Beyer's threshold matrix. Application of the discrete dither causes deep dots to be sufficiently scattered and realizes a non-biased distribution of deep dots and light dots, thereby improving the picture quality.

In case that the deep level data Dth is greater than the threshold value Dref1 at step S224, the program determines the on state of deep dots in the target pixel and calculates a resulting value RV at step S226. The resulting value RV corresponds to the density of the target pixel (evaluation value of deep dots). In the on state of deep dots, that is, when it is determined that dots of higher-density ink are to be formed in the target pixel, the value corresponding to the density of the pixel (for example, the value 255) is set as the resulting value RV. The resulting value RV may be a fixed value or set as a function of deep level data Dth.

In case that the deep level data Dth is not greater than the threshold value Dref1 at step S224, on the contrary, the program determines the off state of deep dots, that is, no formation of dots by the higher-density ink in the target pixel, and sets the value '0' to the resulting value RV at step S228. Since the white background of the sheet of paper P remains in the place where no dots of the higher-density ink are formed, the resulting value RV is set equal to zero.

Figure 17:
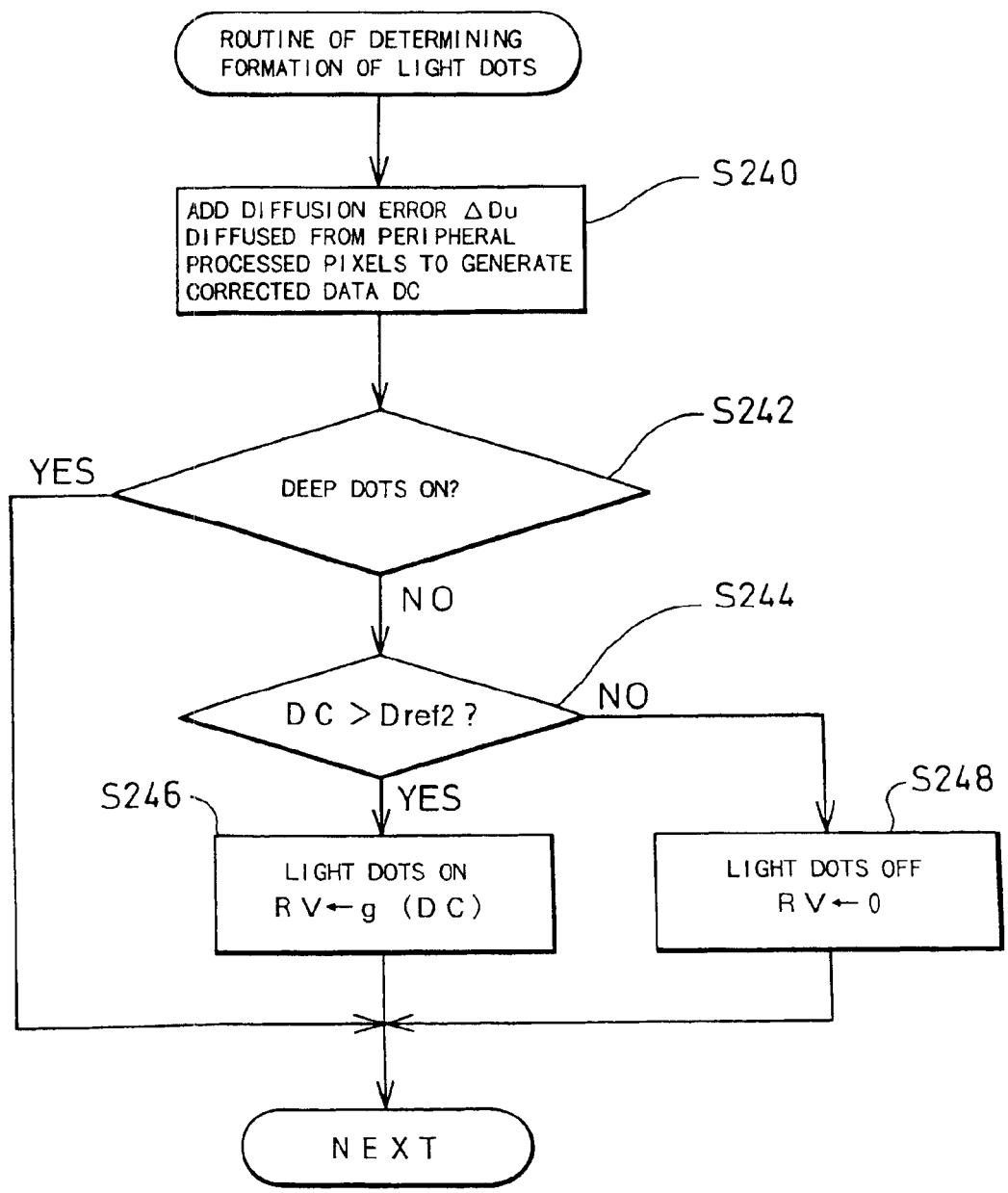
FIG. 17 is a flowchart showing a routine for determining formation of light dots.

After determining the on/off state of deep dots, the program enters a routine of determining formation of light dots shown in the flowchart of FIG. 17, in order to determine the on/off state of light dots. At step S240, the halftone module 99 calculates light dot data Dx used for determining the on/off state of light dots and obtains corrected data DC by adding a diffusion error ADu diffused from the processed pixels to the light dot data Dx. The light dot data Dx is obtained by the following equation:

$$Dx = Dth \cdot Z/255 + Dtn \cdot z/255$$

wherein Dtn denotes light level data read from the table of FIG. 18, based on the tone data DS, Z represents an evaluation value in the case of the on state of deep dots, and z denotes an evaluation value in the case of the on state of light dots. The light dot data Dx is a sum of the deep level data and the light level data respectively multiplied by weighting coefficients, which depend upon the respective evaluation values. One of the main characteristics of the present invention is that the on/off state of light dots is determined by the light dot data Dx, which is based on both the deep level data and the light level data. Since the evaluation value Z of deep dots is equal to 255, the above equation is rewritten as:

$$Dx = Dth + Dtn \cdot z/255$$

which is actually used to calculate the light dot data Dx at step S240. The evaluation value z of light dots is significantly smaller than the evaluation value Z of deep dots and is set equal to 160 in this embodiment.

At subsequent step S242, it is determined whether or not deep dots are in the on state, that is, whether or not deep dots are formed (for example, by the cyan ink C1). In case of no formation of deep dots, the program carries out the processing of and after step S244, in order to determine the on/off state of the lower-density dots or light dots (for example, by the light cyan ink C2).

In this embodiment, the error diffusion method is adopted to determine the on/off state of light dots, that is, formation or non-formation of light dots, for example, by the light cyan ink C2. At step S244, the tone data DC corrected according to the concept of error diffusion is compared with a predetermined threshold value Dref2 for light dots. The threshold value Dref2 represents a reference value for determining whether or not dots should be formed by the low-density, light ink in a target pixel. Here the threshold value Dref2 is a variable varying with the corrected data DC.

In case that the corrected data DC is greater than the threshold value Dref2 at step S244, the program determines the on state of light dots and calculates a resulting value RV (evaluation value of light dots) at step S246. The resulting value RV here takes the value '122' as a reference value and is corrected by the corrected data DC. In case that the corrected data DC is not greater than the threshold value Dref2 at step S244, on the contrary, the program determines the off state of light dots and sets the value '0' to the resulting value RV at step S248.

FIGS. 19a through 19h show examples of the printing state of light dots and deep dots formed, for example, by the cyan ink C1 and the light cyan ink C2. In the range of low tone data (in the range of tone data=0/256 to 63/256 in this embodiment), dots are formed only by the light cyan ink C2 as shown in FIGS. 19a and 19b. The proportion of light dots existing in a predetermined area increases with an increase in tone data, while formation of deep dots starts and gradually increases as shown in FIGS. 19c through 19e. In the range of higher tone data, no light dots but only deep dots are formed as shown in FIGS. 19f and 19g. When the tone data reaches the maximum, the recording ratio of deep dots is equal to 100% as shown in FIG. 19h.

In the printer 20 of the embodiment discussed above, the ink cartridge 70 mounted on the carriage 30 includes the yellow ink of higher dye density and the higher-density ink and the lower-density ink for both cyan and magenta. In the area where the input image has low tones, the light cyan ink and the light magenta ink having the lower dye densities are used for recording. This improves the granularity in the low tone area, thereby ensuring the extremely high printing quality. The density of yellow ink can be heightened to the extent that does not worsen the granularity with respect to dots of yellow ink. The limit is four times the standard dye density. This structure significantly reduces the mean volume of yellow ink discharged per unit area.

Although the density of yellow ink is heightened in the above embodiment, the principle of the present invention is not restricted to the yellow ink. The same effects can be exerted by increasing the density of any ink having the highest lightness or the lowest conspicuousness of granularity among the combination of color inks used for printing. The embodiment lowers the proportion of dots formed by the yellow ink, in order to correct the biased color balance due to the enhanced dye density of the yellow ink. The bias may alternatively be corrected by decreasing the diameter of dots formed by the yellow ink. The size of dots formed on the sheet of paper P is adjusted by regulating the diameter of each nozzle for spraying ink or the intensity of the voltage pulse (voltage and duration) applied to the piezoelectric element PE. By way of example, the nozzle 66 for the yellow ink Y2 may be formed as the nozzle for smaller diametral dots, whereas the nozzles 62 and 63 for the cyan ink C and the nozzles 64 and 65 for the magenta ink M are formed as the nozzles for greater diametral dots.

In the above embodiment, the programs for controlling formation of the respective color dots are stored in the printer driver 96 included in the computer 90. These programs may, however, be stored in the printer 20. For example, in case that the computer 90 sends image information written in a language, such as PostScript, the printer 20 has a halftone module and other required elements. In the embodiment, the software realizing these functions is stored in a hard disk of the computer 90 and incorporated into the operating system in the form of the printer driver at the time of activation of the computer 90. In accordance with another possible application, the software may be stored in portable storage media (carriable storage media), such as floppy disks and CD-ROMs, and transferred from the portable storage media to the main memory of the computer system or an external storage device. The software may further be transferred from the computer 90 to the printer 20. Still another possible application utilizes an apparatus for supplying the software via a communication line. In this structure, the contents of the halftone module may be transferred to either the computer 90 or the printer 20 via the communication line.

In the above embodiment, a predetermined voltage is applied to the piezoelectric elements PE for a predetermined time period, in order to discharge both the low-density ink and the high-density ink. Another method may, however, be applicable to discharge inks. The available ink-discharge techniques can be classified into two types; that is, the method of separating ink particles from a continuous jet stream of ink and the on-demand method applied in the above embodiment. The former type includes a charge modulation method that separates droplets of ink from a jet stream of ink by means of charge modulation and a micro-dot method that utilizes fine satellite particles produced in the process of separating large-diametral particles from a jet stream of ink. These methods are applicable to the printing system of the present invention that utilizes inks of different densities.

The on-demand type, on the other hand, produces ink particles required in the unit of dots. An available method of the on-demand type, other than the method utilizing the piezoelectric elements applied in the above embodiment, uses a heating body HT disposed in the vicinity of nozzles NZ of ink, produces bubbles BU by heating ink, and makes ink particles IQ discharged by the pressure of the bubbles BU as shown in FIGS. 20A through 20E. Such on-demand type methods are applicable to the printing system of the present invention that utilizes inks of different densities or plural types of dots having different diameters. The idea of increasing the density of the ink having the highest lightness or the lowest conspicuousness of granularity is also applicable to thermal transfer color printers and electrophotographic color printers, such as laser printers.

The present invention is not restricted to the above embodiment, but there may be many modifications, changes, and alterations without departing from the scope or spirit of the main characteristics of the present invention.

By way of example, several means disposed in the casing of the printer in the above embodiment may be included in an output apparatus for outputting images to be printed. The correction means may be realized by a discrete circuit or by the software in an arithmetic and logic operation circuit including a CPU. In the latter case, for example, the apparatus for outputting images to be printed, such as a computer, carries out the processes relating to the formation of dots, whereas only the mechanism for controlling discharge of inks from the heads and actually forming dots on a paper is disposed in the casing of the printer.

There are several variations in structure of the ink cartridge. For example, when the printing system is used for color printing with a plurality of color inks, three or more different color inks may be stored in a separate vessel from the vessel of black ink. This structure prevents the timing of replacement of the color ink cartridge from being affected by consumption of black ink that is frequently used for printing characters It should be clearly understood that the above embodiment is only illustrative and not restrictive in any sense. The scope and spirit of the present invention are limited only by the terms of the appended claims.

What is claimed is:

1. An ink cartridge used in a method of recording a multi-tone image by controlling a head that is able to record at least three different color inks, which are mixable to express hues in a predetermined range, and regulating a distribution of dots formed by said at least three different color inks based on tone signals regarding an original image to be printed, said method comprising the steps of: determining a density ratio of a specific color ink, which has highest lightness against a fixed recording ratio among said at least three different color inks, to the other color inks, in order to enable a color balance to be biased to said specific color ink having the highest lightness in case that said specific color ink and the other color inks have an identical recording ratio per unit area; and correcting a recording amount of said specific color ink having the highest lightness to a level that cancels said bias wherein said ink cartridge has said at least three different color inks, which are mixable to express hues in the predetermined range and stored therein, wherein said specific color ink having the highest lightness among said at least three different color inks has a dye density higher than a balancing density that ensures a color balance in case that said at least three different color inks have an identical recording ratio per unit area, a volume of said specific color ink stored in said ink cartridge being not greater than a volume of each of the other color inks.

2. An ink cartridge used in a method of recording a multi-tone image by controlling a head that is able to record at least three different color inks, which are mixable to express hues in a predetermined range, and regulating a distribution of dots formed by said at least three different color inks based on tone signals regarding an original image to be printed, said method comprising the steps of: determining a density ratio of a specific color ink, which has lowest conspicuousness of granularity against a fixed recording ratio among said at least three different color inks, to the other color inks, in order to enable a color balance to be biased to said specific color ink having the lowest conspicuousness of granularity in case that said specific color ink and the other color inks have an identical recording ratio per unit area; and correcting a recording amount of said specific color ink having the lowest conspicuousness of granularity a level that cancels said bias, wherein said ink cartridge has said at least three different color inks, which are mixable to express hues in the predetermined range and stored therein, wherein said specific color ink having the lowest conspicuousness of granularity among said at least three different color inks has a dye density higher than a balancing density that ensures a color balance in case that said at least three different color inks have an identical recording ratio per unit area, a volume of said specific color ink stored in said ink cartridge being not greater than a volume of each of the other color inks.

3. An ink cartridge attachable to a printer for recording ink dots, which are mixed to express hues in a predetermined range, on a printing object, said ink cartridge comprising:

at least three ink reservoirs, respectively containing at least a first color ink, a second color ink, and a third color ink, which, when mixed, express hues in a predetermined range, wherein a smaller volume of a specific color ink, which has at least one of a highest lightness and a lowest conspicuousness of granularity among said first, second and third color inks, is used than that of the other ink colors when the first, second and third colors are mixed to express a medium tone of gray.

4. An ink cartridge in accordance with claim 3, wherein said printer is capable of expressing printing image in 256 tones, and said medium tone has a value of 128.

5. An ink cartridge in accordance with claim 3 or 4, wherein said first, second and third color inks comprise yellow, magenta and cyan, and the specific color ink is yellow.

6. An ink cartridge in accordance with claim 5, wherein a capacity of the ink reservoir containing the yellow ink is not greater than a capacity of the ink reservoirs containing the magenta and cyan inks.

7. An ink cartridge in accordance with claim 5, wherein the yellow ink has a higher density than the magenta and cyan inks.

8. An ink cartridge in accordance with claim 3 or 4, wherein the color inks include yellow, magenta, cyan, and light magenta and light cyan, each of which having a lower density than that of each of the magenta and cyan inks, and the specific color ink is yellow.

9. An ink set comprising:

a plurality of ink reservoirs that are attachable to a printer for recording ink dots, which ink dots are mixed to express hues in a predetermined range, on a printing object, said reservoirs being attached to the printer, each of the reservoirs containing a single color ink, and the ink reservoirs respectively containing at least a first, a second and a third color inks that, when mixed, express hues in a predetermined range, wherein a smaller volume of a specific color ink, which has at least one of a highest lightness and a lowest conspicuousness of granularity among said first, second and third color inks, is used than that of the other two ink colors when the first, second and third colors are mixed to express a medium tone of gray.

10. An ink set in accordance with claim 9, wherein said printer is capable of expressing printing image in 256 tones, and said medium tone has a value of 128.

11. An ink set in accordance with claim 9 or 10, wherein said first, second and third color inks comprise yellow, magenta and cyan, and the specific color ink is yellow.

12. An ink set in accordance with claim 11, wherein a capacity of the ink reservoir containing the yellow ink is riot greater than a capacity of the ink reservoirs containing the magenta and cyan inks.

13. An ink set in accordance with claim 11, wherein the yellow ink has a higher density than the magenta and cyan inks.

14. An ink set in accordance with claim 9 or 10 wherein the color inks include yellow, magenta, cyan, and light magenta and light cyan, each of which having a lower density than that of each of the magenta and cyan inks, and the specific color ink, which has at least one of the highest lightness and the lowest conspicuousness of granularity among said at least three different color inks, is yellow.

15. An ink cartridge attachable to a printer for recording ink dots, which are mixed to express hues in a predetermined range, on a printing object, said ink cartridge comprising a cyan ink, a magenta ink and a yellow ink, wherein a smaller volume of the yellow ink, which has a highest lightness among the inks, is used than that of the cyan and the magenta inks when the yellow, cyan and magenta inks are mixed to express gray.

16. An ink cartridge in accordance with claim 15, wherein an amount of the yellow ink is not greater than an amount of the cyan and magenta inks.

17. An ink cartridge attachable to a printer for recording ink dots, which are mixed to express hues in a predetermined range, on a printing object, said ink cartridge comprising;

a cyan ink, a magenta ink, a yellow ink, a light cyan ink and a light magenta ink, the light cyan ink and the light magenta ink respectively having a lower density than that of each of the cyan and magenta inks, wherein a smaller volume of the yellow ink, which has a highest lightness among the inks, is used than that of the other cyan and magenta inks when the yellow, cyan and magenta inks are mixed to express gray.

18. An ink cartridge in accordance with claim 17, wherein a capacity of the yellow ink is not greater than a capacity of the other inks.

19. An ink cartridge attachable to a printer for recording ink dots, which are mixed to express hues in a predetermined range, on a printing object, said ink cartridge comprising:

a cyan ink, a magenta ink and a yellow ink, wherein the yellow ink, which has a highest lightness among said inks, is such that a color balance expressed by the cyan, magenta and yellow inks is biased to the yellow color when equal amounts of the cyan, magenta and yellow inks are ejected to produce a gray balance.

20. An ink cartridge in accordance with claim 19, wherein a capacity of the yellow ink is not greater than a capacity of the other two inks.

21. An ink cartridge attachable to a printer for recording ink dots, which are mixed to express hues in a predetermined range, on a printing object, said ink cartridge comprising:

a cyan ink, a magenta ink, a yellow ink, a light cyan ink and a light magenta ink, the light cyan ink and the light magenta ink respectively each having a lower density than that of the cyan ink and the magenta ink, wherein the yellow ink, which has a highest lightness among said inks, is such that a color balance expressed by the cyan, magenta and yellow inks is biased to the yellow color when equal amounts of the cyan, magenta and yellow inks are ejected to produce a gray balance.

22. An ink cartridge in accordance with claim 21, wherein a capacity of the yellow ink is not greater than a capacity of the other inks.

23. An ink set attachable to a printer for recording ink dots, which ink dots are mixed to express hues in a predetermined range, on a printing object, said ink set comprising a cyan ink, a magenta ink and a yellow ink, wherein a smaller volume of the yellow ink, which has a highest lightness among the inks, is used than that of the cyan and the magenta inks when the yellow, cyan and magenta inks are mixed to express gray.

24. An ink set attachable to a printer for recording ink dots, which ink dots are mixed to express hues in a predetermined range, on a printing object, said ink set comprising;

a cyan ink, a magenta ink, a yellow ink, a light cyan ink and a light magenta ink, the light cyan ink and the light magenta ink respectively having a lower density than that of each of the cyan and magenta inks, wherein a smaller volume of the yellow ink, which has a highest lightness among the inks, is used than that of the other cyan and magenta inks when the yellow, cyan and magenta inks are mixed to express gray.

25. An ink set attachable to a printer for recording ink dots, which ink dots are mixed to express hues in a predetermined range, on a printing object, said ink set comprising:

a cyan ink, a magenta ink and a yellow ink, wherein the yellow ink, which has a highest lightness among said inks, is such that a color balance expressed by the cyan, magenta and yellow inks is biased to the yellow color when equal amounts of the cyan, magenta and yellow inks are ejected to produce a gray balance.

26. An ink set attachable to a printer for recording ink dots, which ink dots are mixed to express hues in a predetermined range, on a printing object, said ink set comprising:

a cyan ink, a magenta ink, a yellow ink, a light cyan ink and a light magenta ink, the light cyan ink and the light magenta ink respectively each having a lower density than that of the cyan ink and the magenta ink, wherein the yellow ink, which has a highest lightness among said inks, is such that a color balance expressed by the cyan, magenta and yellow inks is biased to the yellow color when equal amounts of the cyan, magenta and yellow inks are ejected to produce a gray balance.

* * * * *